United States Patent [19]
Nelson

[11] Patent Number: 5,950,210
[45] Date of Patent: Sep. 7, 1999

[54] DATABASE ROW VERSION DIFFERENTIATION PROCESS

[76] Inventor: Paul M. Nelson, 14384 La Harina Ct., San Diego, Calif. 92129-4201

[21] Appl. No.: 08/790,165

[22] Filed: Jan. 29, 1997

Related U.S. Application Data

[60] Provisional application No. 60/010,712, Jan. 29, 1996.

[51] Int. Cl.⁶ .................................................. G06F 17/30
[52] U.S. Cl. ............................... 707/203; 707/1; 707/203
[58] Field of Search ........................... 364/300; 707/203, 707/1

[56] References Cited

U.S. PATENT DOCUMENTS

| | | | |
|---|---|---|---|
| 4,912,637 | 3/1990 | Sheedy et al. | 364/300 |
| 5,278,979 | 1/1994 | Foster et al. | 395/600 |
| 5,280,612 | 1/1994 | Lorie et al. | 395/600 |
| 5,333,310 | 7/1994 | Sakai | 395/600 |
| 5,347,653 | 9/1994 | Flynn et al. | 395/600 |
| 5,357,631 | 10/1994 | Howell et al. | 395/600 |
| 5,386,559 | 1/1995 | Eisenberg et al. | 395/600 |
| 5,440,730 | 8/1995 | Elmasri et al. | 395/600 |
| 5,546,576 | 8/1996 | Cochrane | 395/600 |
| 5,561,793 | 10/1996 | Bennett | 395/600 |
| 5,594,899 | 1/1997 | Knudsen | 395/600 |

*Primary Examiner*—Paul R. Lintz
*Assistant Examiner*—Jean Bolte Fleurantin
*Attorney, Agent, or Firm*—Fitch, Even, Tabin & Flannery

[57] ABSTRACT

A method for row version differentiation in a database management system employs steps of identifying a versioned table to said database; creating a logical primary key, comprising a prescribed number of columns in the versioned table, the logical primary key being created in a physical primary key of the versioned table; defining at least one column of the physical primary key as a version effective reference value; deriving version differentiation criteria information from a version differentiation predicate included in a request submitted by a database user, the version differentiation predicate including a name of the versioned table defined to a database, a target effective status, and a target value for version differentiation processing; retrieving rows of the versioned table that satisfy the version differentiation criteria derived from the version differentiation predicate by comparing the effective reference values of the versioned table with the version differentiation criteria.

9 Claims, 14 Drawing Sheets

FOREIGN KEY DEFINITION PROCESS

DBMS CATALOG DATABASE

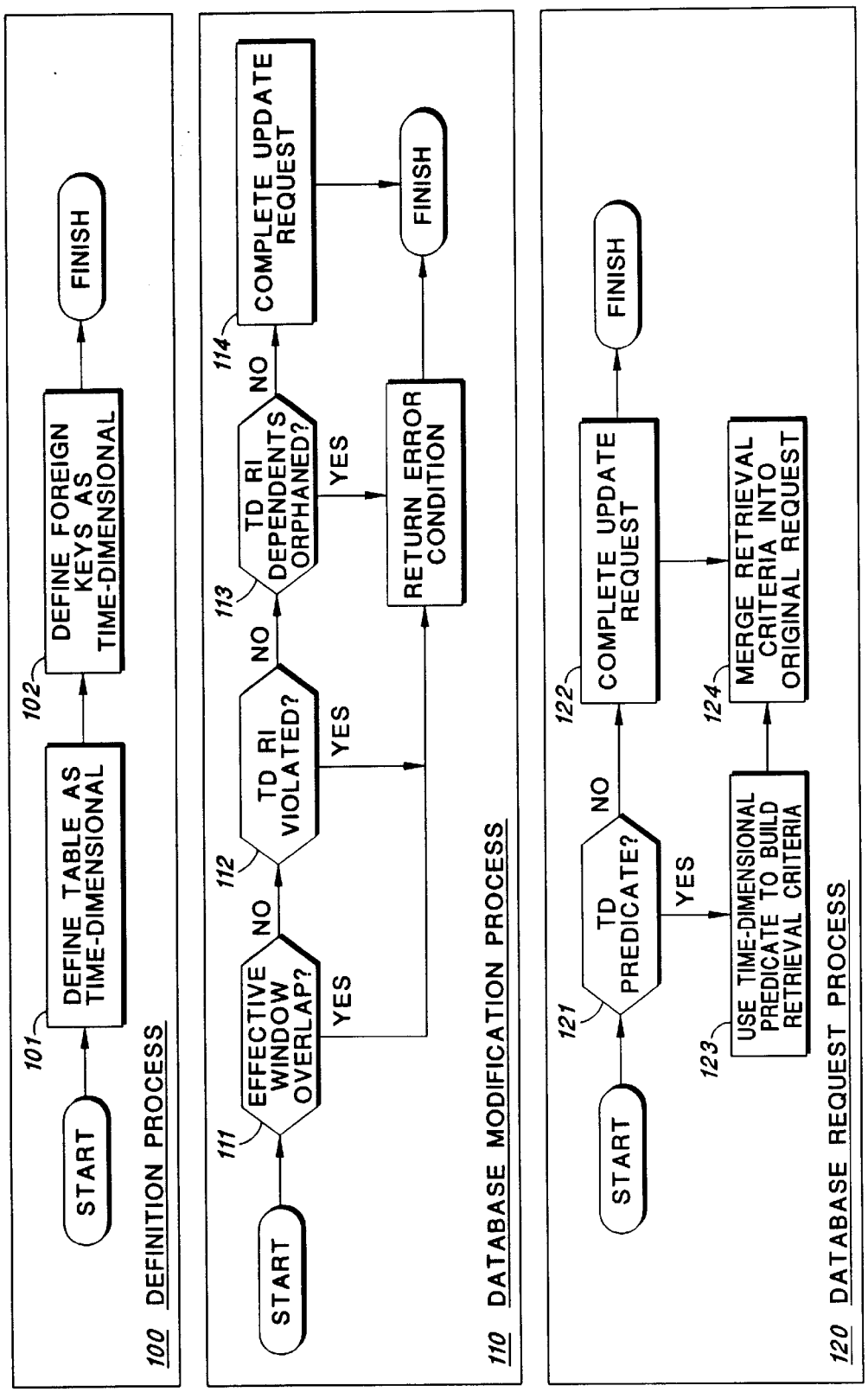
FIG. 2  VERSION DIFFERENTIATION PROCESS OVERVIEW

TABLE DEFINITION PROCESS

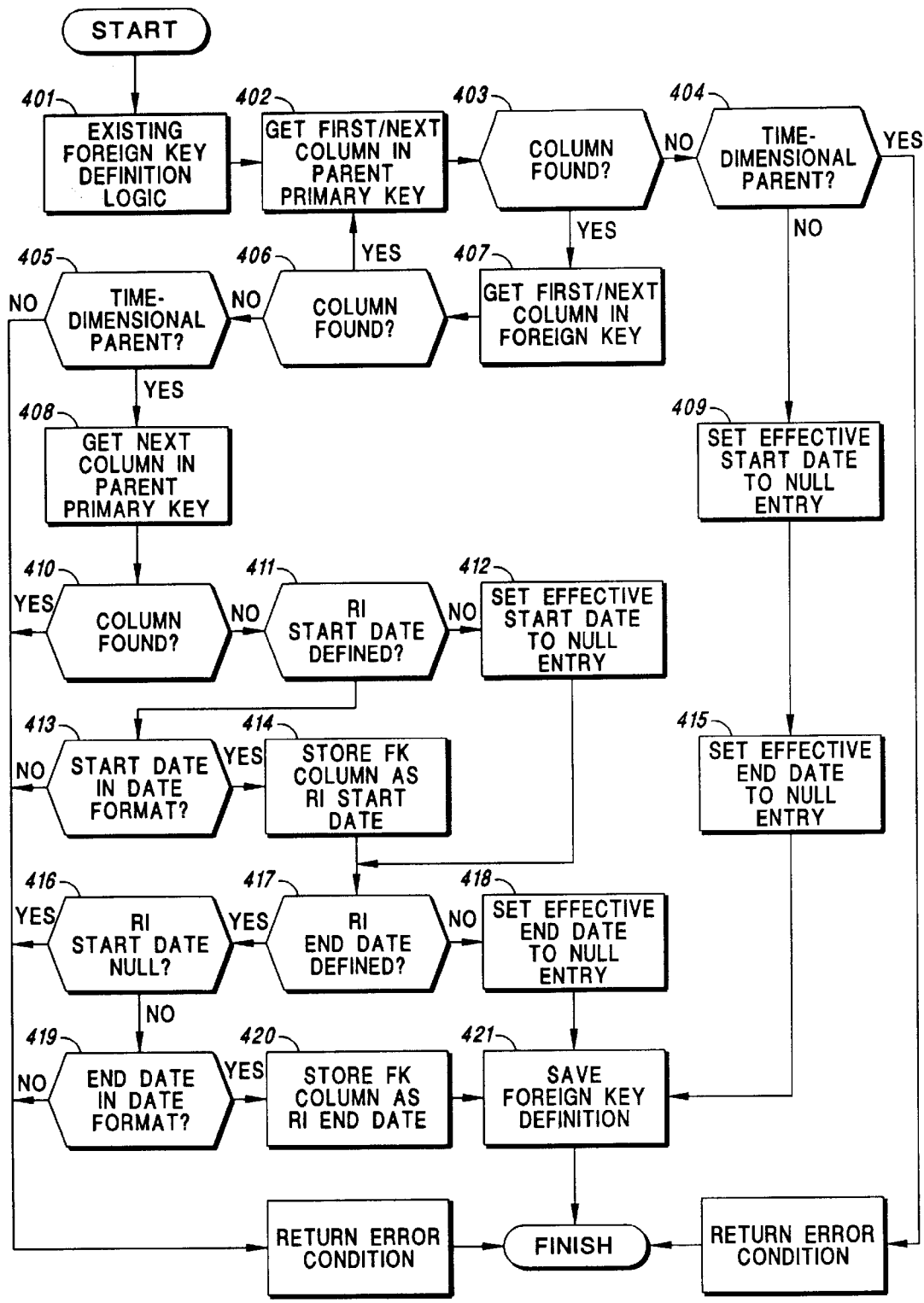
FIG. 5  FOREIGN KEY DEFINITION PROCESS

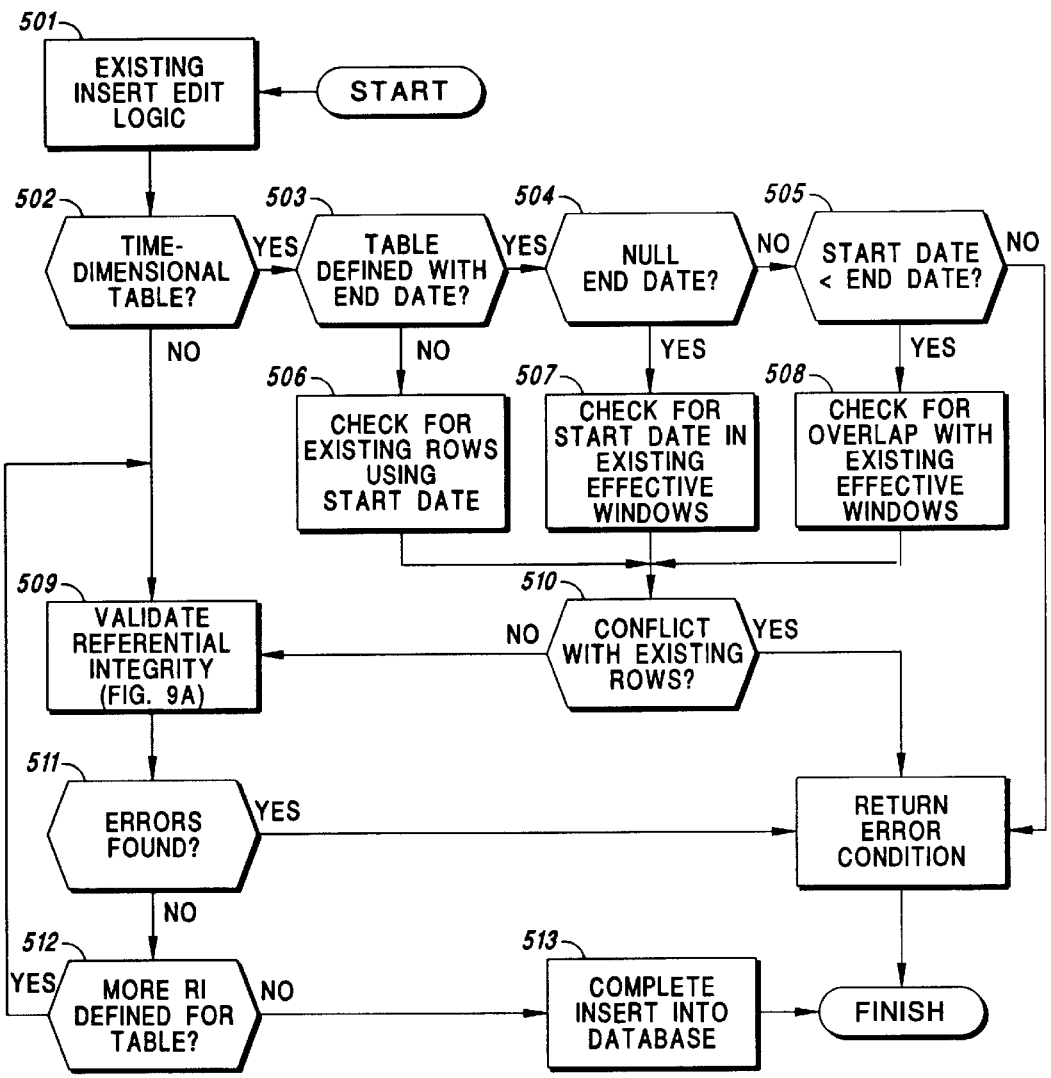
FIG. 6  INSERT PROCESS

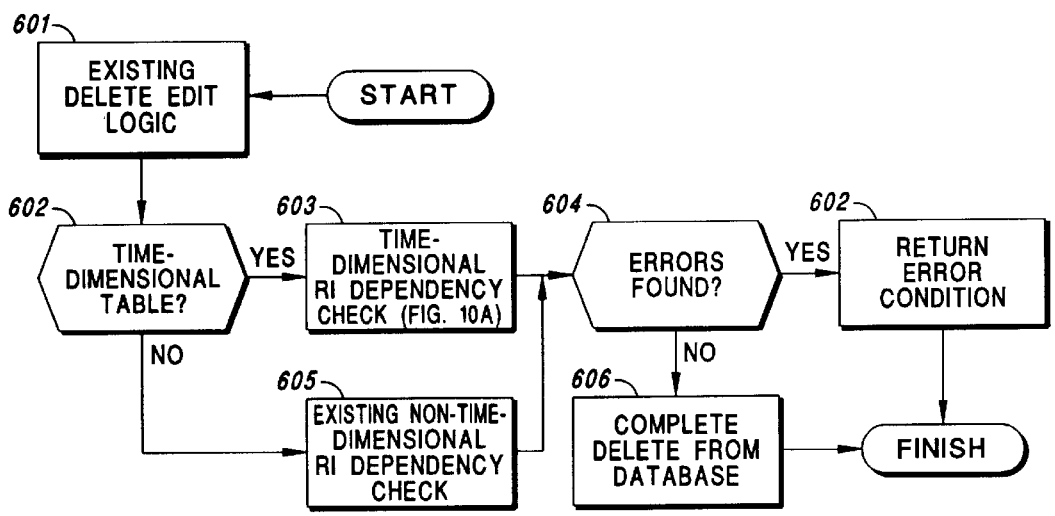
FIG. 7 DELETE PROCESS
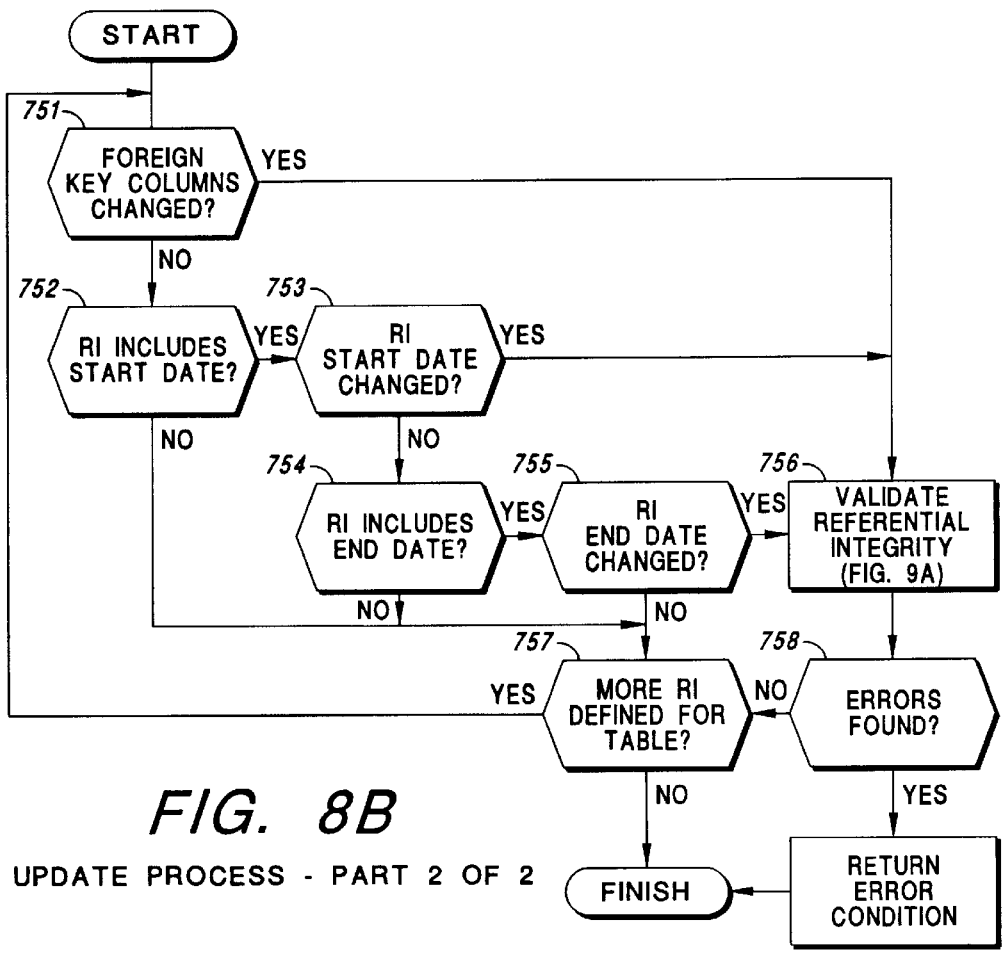
FIG. 8B UPDATE PROCESS - PART 2 OF 2

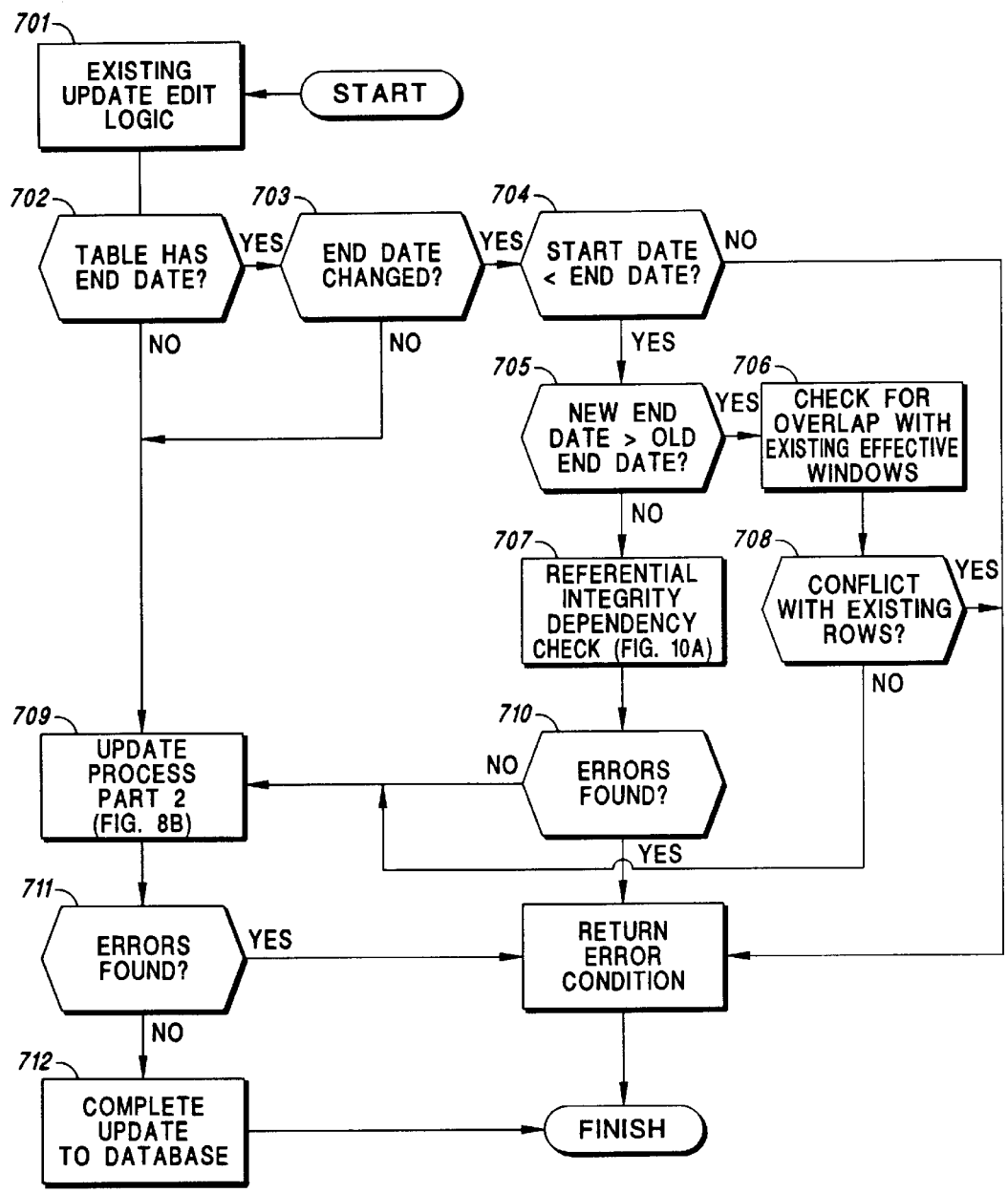
FIG. 8A  UPDATE PROCESS - PART 1 OF 2

REFERENTIAL INTEGRITY VALIDATION PROCESS
PART 1 OF 3

REFERENTIAL INTEGRITY VALIDATION PROCESS
PART 2 OF 3

REFERENTIAL INTEGRITY VALIDATION PROCESS
PART 3 OF 3

REFERENTIAL INTEGRITY DEPENDENCY CHECK
PART 1 OF 2

REFERENTIAL INTEGRITY DEPENDENCY CHECK
PART 2 OF 2

SQL REQUEST EXECUTION PROCESS - PART 1 OF 2

SQL REQUEST EXECUTION PROCESS - PART 2 OF 2

DATABASE ROW VERSION DIFFERENTIATION PROCESS

This patent document is a Non-Provisional patent document filed in accordance with 35 U.S.C. § 111(a) and entitled to priority under 35 U.S.C. § 119(e) to Provisional Patent Application No. 60/010,712, of Nelson, for RELATIONAL DATABASE ROW VERSION DIFFERENTIATION PROCESS, filed Jan. 29, 1996 in accordance with 35 U.S.C. § 111(b), and hereby incorporated by reference.

A portion of the disclosure of this patent document contains material that is subject to copyright protection. The copyright owner has no objection to the facsimile reproduction by anyone of this patent document or the patent disclosure, as it appears in the United States Patent and Trademark Office patent files or records, but otherwise reserves all copyright rights whatsoever.

BACKGROUND OF THE INVENTION

This invention relates to database management systems and more specifically to a method of differentiating between versions of database table rows representing the same information items at differing points in time.

Database management systems, e.g., relational database management systems, were designed to provide a means of storing information in a highly organized fashion. Each relational database contains tables which represent groups of related pieces of information. Each piece of information in a table is referred to as a table column. Multiple rows can be created for each table that contains a set of column values for specific entities.

Consider as an example, a situation in which a company is required to retain information in a relational database concerning its employees and the rate of pay that each employee receives at any given point in time. Two tables may be created, one to house information about the employees, i.e., an EMPLOYEE TABLE, and the other to house information concerning the pay rates of the employees, i.e., an EMPLOYEE_PAY table. The EMPLOYEE table might contain columns such as an employee identifier and a name. The EMPLOYEE_PAY table might contain columns such as an employee identifier, a pay rate, and the first date on which the pay rate is considered the effective pay rate for the employee. The relational database for this example can be represented as follows:

| EMPLOYEE TABLE | EMPLOYEE_PAY TABLE |
|---|---|
| EMPLOYEE_ID | EMPLOYEE_ID |
| NAME | PAY_EFFECTIVE_DATE |
|  | PAY_RATE |

Rows are created in the EMPLOYEE table as information is added to the database for each employee in the company. Similarly, rows are created in the EMPLOYEE_PAY table as information concerning the pay rates of the employees is added to the database.

The EMPLOYEE_PAY table is a versioned table. Several different versions of the pay rate for a specific employee could exist in the rows of the EMPLOYEE_PAY table. These versions could represent historical pay rates, active pay rates, and future pay rates.

Although versioned tables can be used to capture differing versions of the same information at various points in time, retrieval of information from versioned tables is extremely complex. The effective values used in versioned tables (like the PAY_EFFECTIVE_DATE of the EMPLOYEE_PAY table) actually represent a range of values as opposed to the single value contained in storage for the column. The value maintained in storage merely represents the first value in the range. The range of effective values may, in addition, be dependent upon other rows in the table with the same logical primary key. In the case of the EMPLOYEE_PAY table, the logical primary key is the EMPLOYEE_ID column. To determine the full range of date values on which a particular EMPLOYEE_PAY table row is considered effective, other rows with the same EMPLOYEE_ID must be examined. These implied rules must be considered while retrieving information from versioned tables, complicating the logic involved. Currently, there are few alternatives available to requesters of relational databases that allow them to differentiate between the rows of versioned tables. All existing methods have serious deficiencies.

In most cases, the task of differentiating between the rows of versioned tables is left entirely to the requester. The requester must include logic in their requests that identifies the version or versions that they require. The additional commands often include a complex SQL construct called a 'subquery' that extracts the exact effective value of the version desired by the requester. By way of example, the SQL for a typical request that retrieves the current pay rate for employee '12345' from the EMPLOYEE_PAY table is as follows:

```
SELECT  PAY-RATE
FROM    EMPLOYEE
WHERE   EMPLOYEE_ID = '12345'
  AND   PAY_EFFECTIVE_DATE =
    (SELECT MAX (PAY_EFFECTIVE_DATE)
     FROM    EMPLOYEE
     WHERE   EMPLOYEE_ID = '12345'
       AND   PAY_EFFECTIVE_DATE < CURRENT DATE)
```

Most of the logic involved in version differentiation is too complex for inexperienced requesters and adds a significant amount of development time for requesters who are experienced.

There are other problems inherent with including version differentiation logic in requests. The same version differentiation logic must be included in multiple requests, increasing the amount of maintenance required in the event that database changes occur. Reliability is also decreased since the version differentiation logic must be re-written in every request leading to a higher probability of error. The subquery logic that must be included using this approach is also relatively inefficient.

Another method of accomplishing version differentiation is to include the differentiation logic in database views. In the example presented, a view could be created which retrieves active EMPLOYEE_PAY rows based on the CURRENT DATE system register. Using this method, a separate view must be created for each additional variable that can be used to reference effective values for retrieval. If a requirement existed to retrieve historic or pending employee pay rates from the example database, additional views must be created to accomplish this. By employing this method, inexperienced requesters are not required to include the complex subquery logic in their requests, but they are required to know which view includes the reference variable to achieve the desired results. Since the subquery logic may need to be repeated in multiple views, the maintenance and reliability problems described earlier are diminished, but still exist. The creation and maintenance of views also places an additional burden on database administration staff.

In some cases, database developers choose to create denormalized columns containing the current effective status of each row of a versioned table. An example of this method would be the creation of an effective status column in the EMPLOYEE_PAY table of the example database. Although this method does alleviate some of the problems related to using the version differentiation logic, it places an additional burden on the data maintenance staff. Procedures must be created which maintain the effective status columns when changes occur which affect their values. Procedures must also be created and run on a regular basis in the case where the effective values are temporal, such as dates or times. In these cases, the effective status may change as a result of the passing of time.

An additional problem with this method is that only one version may exist with a particular effective status. If more than one is allowed to exist, version differentiation logic must be included in requests negating any benefits gained.

Database developers often choose to create multiple tables containing information that could be otherwise contained in a single versioned table. One of the tables may contain current versions, another may contain historic versions and a third may contain pending versions. Applying this approach to the example database, a column could be added to the EMPLOYEE table to contain a current pay rate, a table could be created to contain historic pay rate information and another could be created to hold pending pay rates. It does become easier to retrieve information from current versions, but the version differentiation logic must still be included when accessing historic or pending versions. In addition, requesters are required to know which of these tables must be accessed in different situations. Processes must also be created which move versions from one table to another as their effective status changes from pending to active, or from active to inactive.

Regardless of the method implemented, database management systems lack the ability to perform certain functions that are required to accurately process versioned tables in a relational database context. Database management systems can only enforce referential constraints on a strict column matching basis. This is not appropriate in the case of versioned tables. The effective values contained in versioned tables actually represent a range of values for which a particular row is effective. Currently, database management systems are unable to recognize these 'effective windows' and are therefore unable to enforce referential integrity on an effective window basis. Nor are database management systems able to prevent overlapping of the effective windows of rows of a versioned table which represent the same information. Edit procedures must be created by the data maintenance staff to enforce these restrictions.

U.S. Pat. No. 5,280,612 to Lorie et al. (1994), U.S. Pat. No. 5,333,310 to Sakai (1994), and U.S. Pat. No. 5,440,730 to Elmasri et al. (1995) all disclose inventions which attempt to solve the efficiency problems related to retrieving information from versioned tables. The inventions disclosed in these patents do not attempt to significantly simplify the method by which information is requested from versioned tables on a database. Nor do they attempt to alter the database management system significantly in order to allow it to process versioned tables in a manner that prevents overlapping of effective windows or allows referential integrity to be enforced on an effective window basis.

U.S. Pat. No. 5,347,653 to Flynn et al. (1994), U.S. Pat. No. 5,357,631 to Howell et al. (1994), and U.S. Pat. No. 5,386,559 to Eisenberg et al. (1995) all disclose inventions that propose various methods of allowing database management systems to accommodate versioned tables. All of the inventions disclosed require that extensive modifications be made to the database management system. The three methods described represent a departure from the method by which non-versioned tables are processed in a relational database. None of the three inventions attempt to significantly simplify the method of requesting historical, active and pending information from versioned tables in a relational database. Nor do they allow for the database management system to enforce referential integrity in a manner that is consistent with that of non-versioned tables.

SUMMARY OF THE INVENTION

Accordingly, several features of various embodiments of the present invention are to provide a version differentiation process, the implementation of which requires relatively minor modifications to existing database management systems, that allows historical, active, and pending versions to be maintained in a single versioned table, that allows versioned tables to be processed by the database management system in a manner consistent with the way in which non-versioned tables are processed, that allows referential constraints to be enforced on an effective window basis for versioned tables, that automatically prevents overlapping of the effective windows of versioned tables, that does not require that processes be created to maintain denormalized version control columns, that allows requesters to retrieve information from versioned tables in a simple manner, that does not require that views, stored procedures or denormalized columns be created to simplify access by requesters, that allows for the use of the most efficient version differentiation logic possible, that minimizes the possibility of erroneous requests, and that minimizes the time required to develop requests which access information from versioned tables.

Further features provide a version differentiation process that smoothly integrates versioned tables and version differentiation processing with existing relational database concepts, that allows versioned tables to be identified to the database management system by database developers in a simple manner similar to that in which non-versioned tables are defined, which allows versioned tables to be based upon effective values of any data type for which a sequence can be automatically determined including numbers, dates, times and characters.

These features are accomplished in such various embodiments of the present invention by allowing versioned tables to be identified as such to the database management system. The name of one column in each versioned table is, in such embodiments, identified to the database management system as a reference column, e.g., an effective start column, an effective end column, an effective middle column or the like. Additional columns may be optionally identified as other reference columns, e.g., an effective end column for the table in a case where the reference column is an effective start column. The effective start and end columns for versioned tables, for example, may be of any data type for which an order can be automatically determined. Since version differentiation logic is similar and predictable for all versioned tables, this logic is internalized into the database management system. A simple SQL predicate can, for example, be introduced, which is used to convey basic version differentiation criteria from the requester to the database management system. The database management system combines the information contained in the predicate with the information defined for versioned tables to complete the request. Referential constraints that name a versioned table as the parent, may specify columns from the dependent table as effective start and effective end columns. The database management system will use the information defined for versioned tables and referential constraints to perform referential integrity validation on an effective window basis.

Still further features will become apparent from a consideration of the ensuing description and drawings.

BRIEF DESCRIPTION OF THE DRAWINGS

In the drawings, closely related figures have the same number but different alphabetic suffixes. The reference numbers used in each figure begin with the figure numeral.

FIG. 2 is a flowchart showing an overview of the version differentiation process;

FIG. 5 is a flowchart showing the logic added to the foreign key definition process in the preferred embodiment;

FIG. 6 is a flowchart showing the logic added to the insert process in the preferred embodiment;

FIG. 7 is a flowchart showing the logic added to the delete process in the preferred embodiment;

FIGS. 8A, and 8B are flowcharts showing the logic added to the update process in the preferred embodiment;

DETAILED DESCRIPTION OF THE PREFERRED EMBODIMENTS

Figure 1:
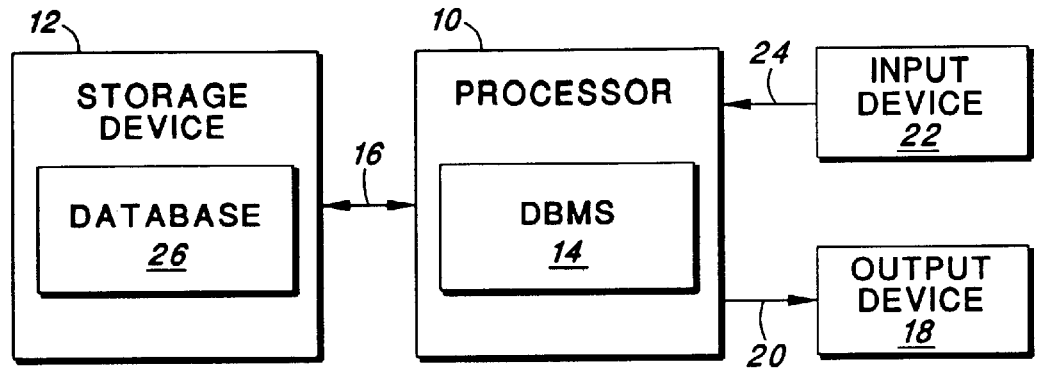
FIG. 1 is a block diagram showing a processor and a memory device in conjunction with a database management system in accordance with one embodiment of the present invention.

A glossary is provided that defines terms that are used in the detailed description of the preferred embodiments.
Glossary ACTIVE EFFECTIVE STATUS—A row of a time-dimensional table having an active effective status at a given point in time is considered to be the current version of the rows in a group of rows having the same logical primary key.

EFFECTIVE END DATE—The effective end date is the date on which a row is first considered to be an inactive version. Effective end dates mark the termination of effective windows. The date immediately preceding an effective end date is the last chronological value included in the effective window. The effective end date itself is not included in the effective window, but is the first date following the effective window.

EFFECTIVE START DATE—An effective start date is the date on which a row is first considered to be an active version. Effective start dates mark the beginning of effective windows. The effective start date is included in the effective window.

EFFECTIVE STATUS—An effective status indicates whether a row in a time-dimensional table is an inactive, active or a pending version. Since their values are volatile, the effective status is not physically maintained in the rows of a time-dimensional table in the preferred embodiment. The effective status is determined, as required, by the database management system.

EFFECTIVE WINDOW—An effective window identifies the range of dates during which a row of a time-dimensional table is considered to be an active version. The effective window begins with and includes the effective start date and ends with, but does not include, the effective end date. A row is considered to be a pending version on all dates prior to the effective window and an inactive version on all dates following the effective window. Effective windows of rows in a time-dimensional table with the same logical primary key may not overlap.

INACTIVE EFFECTIVE STATUS—A row of a time-dimensional table having an inactive effective status at a given point in time is a version of a row in a group of rows having the same logical primary key, which row no longer has an active effective status. A row that no longer has an active effective status is a row for which the time has past during which such row would have an active effective status.

LOGICAL PRIMARY KEY—The logical primary key of a versioned table is equivalent to its physical primary key minus the effective start column. A logical primary key uniquely identifies a group of rows that represent different versions of the same information. Several rows in a versioned table may have the same logical primary key but each row within the set must have its own unique physical primary key.

PENDING EFFECTIVE STATUS—A row of a time-dimensional table having a pending effective status at a given point in time is a version of a row in a group of rows having the same logical primary key, which is awaiting activation. A row awaiting activation is a row for which the time has not yet arrived during which such row will have an active effective status.

PHYSICAL PRIMARY KEY—The physical primary key is the column or group of columns that uniquely identify the individual rows of a table. The physical primary key of a row of a time-dimensional table may be divided into two sections: the logical primary key, which identifies groups of rows representing different versions of the same information, and the effective start date column, which identifies the specific version within a group of rows. Multiple rows may have the same logical primary key, but the physical primary key for each row must be unique.

TABLE TYPE—The table type identifies whether a database table is a time-dimensional table or a standard table.

TIME-DIMENSIONAL FOREIGN KEY—See "TIME-DIMENSIONAL REFERENTIAL CONSTRAINT".

TIME-DIMENSIONAL PREDICATE—A time-dimensional predicate is a phrase appearing in an SQL request which defines the conditions for time-dimensional retrieval. The database management systems interprets the time-dimensional predicate and expands it by applying time-dimensional information that has been defined to the database. The time-dimensional predicate of the preferred embodiment described herein has been designed to be simple to use by requesters, but powerful in its capabilities.

TIME-DIMENSIONAL REFERENTIAL CONSTRAINT—A time-dimensional referential constraint enforces referential integrity on an effective window basis in addition to the standard primary key basis. A time-dimensional referential constraint may be used if the parent table in a foreign key relationship is a time-dimensional table. Columns of the dependent table in the relationship may be identified as the effective start date or the effective end date of the relationship.

TIME-DIMENSIONAL TABLE—A time-dimensional table is a database table whose rows represent versions of information which are active for a specified duration of time. Multiple rows of a time dimensional-table may represent the same information at various points in time. Unlike standard database tables, the logical primary keys of a time-dimensional table are not the same as their physical primary keys. The last column of the physical primary key of each time-dimensional table is an effective start date column which uniquely identifies the version.

System Environment

Referring to FIG. 1, a block diagram is shown of a processor 10 and storage device 12 in combination with the database management system 14 in accordance with one embodiment of the invention. The processor 10 is coupled to the storage device 12 via an appropriate data channel 10, and is coupled to an output device 18 through an output channel 20, and to an input device 22 through an input channel 24. A database 26 resides on the storage device 12 and is accessed by the processor 10 under control of the database management system 14. Database queries and information requests submitted to the processor 10 via the input device 22 and input channel 24, are processed by the database management system 14, which accesses the database 26 in accordance with the teachings of the present invention, and output is generated and sent via the output channel 20 to the output device 18.

The database management system 14 of FIG. 1 is similar to heretofore known database management systems except that it includes features of the present embodiment, as described herein below in reference to FIGS. 2 through 12. Similarly, the storage device 12, input device 22, and output device 18 may be of conventional design, as may be the processor 10. The database 26, of course, contains information relevant to and in accordance with the application to which the present embodiment is applied.

Version Differentiation Process Overview

Referring to FIG. 2, an overview of one embodiment of the version differentiation process is shown in flowchart form. The version differentiation process disclosed in the present invention can be summarized as three major processes executing in the database management system.

The Definition process 100 maintains version differentiation information in the database management system catalog database. The Database Modification process 110 uses the version differentiation information stored in the database management system catalog database and validates proposed database modifications. The Database Request process 120 uses information passed by the requester in a time-dimensional predicate. Version differentiation information stored in the database management system catalog database is then retrieved and combined with the request. The modified request is then executed by the database management system.

The Definition process 100 defines a time-dimensional table in block 101. One column in each time-dimensional table must be identified as the effective start date as part of block 101. Another column in a time-dimensional table may be identified as an effective end date. Foreign keys are defined as time-dimensional in block 102 in any case where the parent in the relationship is a time-dimensional table. Columns in the dependent table may be identified as the effective start date and the effective end date for the foreign key.

The Database Modification process 110 validates the time-dimensional aspect of any proposed modifications prior to updating the database. Condition 111 determines whether a proposed database change would cause an overlap in the effective windows of time-dimensional table rows. If so, the request is rejected and an error is returned. If condition 111 determines that effective window overlaps would not result, control is passed to condition 112. Condition 112 then determines whether a change to a dependent table would violate a time-dimensional referential constraint. If rows of the parent table are not effective for the entire duration of the dependent row effective window, the constraint is violated. If this is the case, the request is rejected and an error is returned. If condition 112 determines that all time-dimensional referential constraints have been satisfied, control is passed to condition 113. Condition 113 then determines whether changes to parent table rows would result in orphaned dependent rows. If the rows of a time-dimensional table named as the parent in a time-dimensional foreign key are modified in such a way as to leave a dependent row in violation of the referential constraint, the dependent row is considered to be orphaned. If condition 113 determines that dependent rows would be orphaned by the modification, the request is rejected and an error is returned. If condition 113 determines that no dependent rows would be orphaned, control is passed to block 114. Block 114 will then complete the requested modifications to the database.

The Database Request process 120 executes all database retrieval requests submitted to the database management system and modifies time-dimensional requests to facilitate processing. Condition 121 determines whether a time-dimensional predicate has been included in the request. If not, control is passed to block 122 which completes the request bypassing time-dimensional processing. If condition 121 determines that a time-dimensional predicate has been included in the request, control is passed to block 123. Block 123 merges the information contained in the time-dimensional predicate with an SQL template to build the complex logic required for version differentiation. Control is then passed to block 124 which merges the version differentiation logic with the original request. After block 124 is completed, the request will contain the references to time-dimensional tables and columns required to complete the specified task. Control is passed from block 124 to block 122 which executes the modified request.

DBMS Catalog Table Additions

Figure 3:
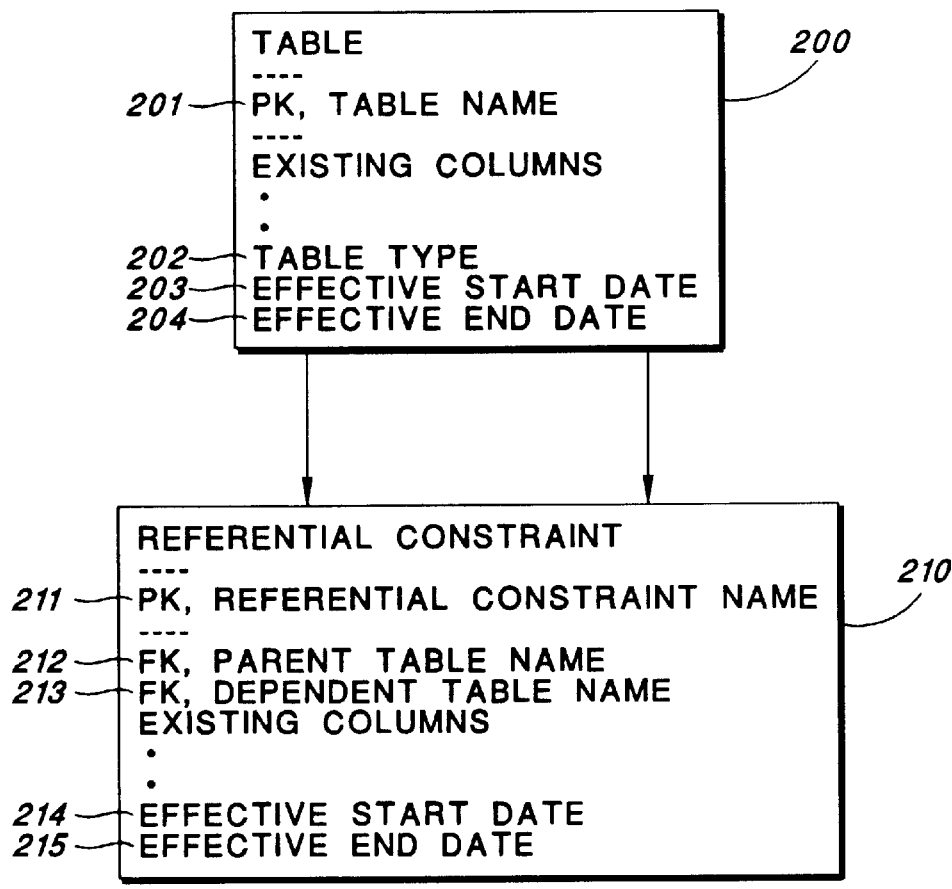
FIG. 3 is a relational database diagram for a DBMS catalog database showing the additions for the preferred embodiment.

Referring to FIG. 3, the modifications to the database management system catalog database for the preferred embodiment are shown in a relational database diagram format. The tables shown are conceptual in nature and are not based on a specific database management system. The tables and columns represented in FIG. 3 exist in various formats in different database management systems.

A catalog table 200 which contains information concerning database tables defined to the database management system. A "Table Name" column 201 represents an existing primary key of the catalog table 200. A "Table Type" column 202 is used to designate whether the catalog table 200 is a time-dimensional table. In accordance with the preferred embodiment, the catalog "Table Type" column 202 contains a "T" if the database table is a time-dimensional table and an "S" if it is a standard table. An "Effective Start Date" column 203 is used to indicate the name of the column in a time-dimensional table that contains the version effective start date. In the preferred embodiment, the "Effective Start Date" column 203 may not contain a null entry if the "Table Type" column 202 identifies a table as a time-dimensional table and must contain a null entry if the catalog table 200 is not a time-dimensional table, i.e., if the table 200 is a standard table. An "Effective End Date" column 204 is used to indicate the name of the column in a time-dimensional table that contains the version effective end date. In the preferred embodiment, the "Effective End Date" column 204 may be null if the "Table Type" column 202 identifies a table as a time-dimensional table and must contain a null entry if the table is not a time-dimensional table Another catalog table 210 contains information concerning the foreign keys or referential constraints defined to the database management system. A "Referential Constraint Name" column 211 uniquely identifies a referential constraint and represents the existing primary key of the catalog table. A "Parent Table Name" column 212 is an existing column and identifies a table that is an owner in the foreign key relationship. The "Parent Table Name" column 212 corresponds to the "Table Name" column 201 of table 200. A "Dependent Table Name" column 213 is an existing column and identifies the table which is the child in the foreign key relationship. The "Dependent Table Name" column 213 also corresponds to the "Table Name" column 201 of table 200. An "Effective Start Date" column 214 indicates the name of the column in the dependent table that contains the start date of the effective window that will be used to validate time-dimensional referential constraints. In the preferred embodiment, the "Effective Start Date" column 214 may contain a null entry if the parent table in the foreign key relationship is a time-dimensional table and must contain a null entry if the parent table is not time-dimensional. An "Effective End Date" column 215 indicates the name of the column in the dependent table that contains the end date of the effective window that will be used to validate time-dimensional referential constraints. In the preferred embodiment, the "Effective End Date" column 215 may contain a null entry if the parent table in the foreign key relationship is a time-dimensional table and must contain a null entry if the parent table is not time-dimensional.

Table Definition Process

Figure 4:
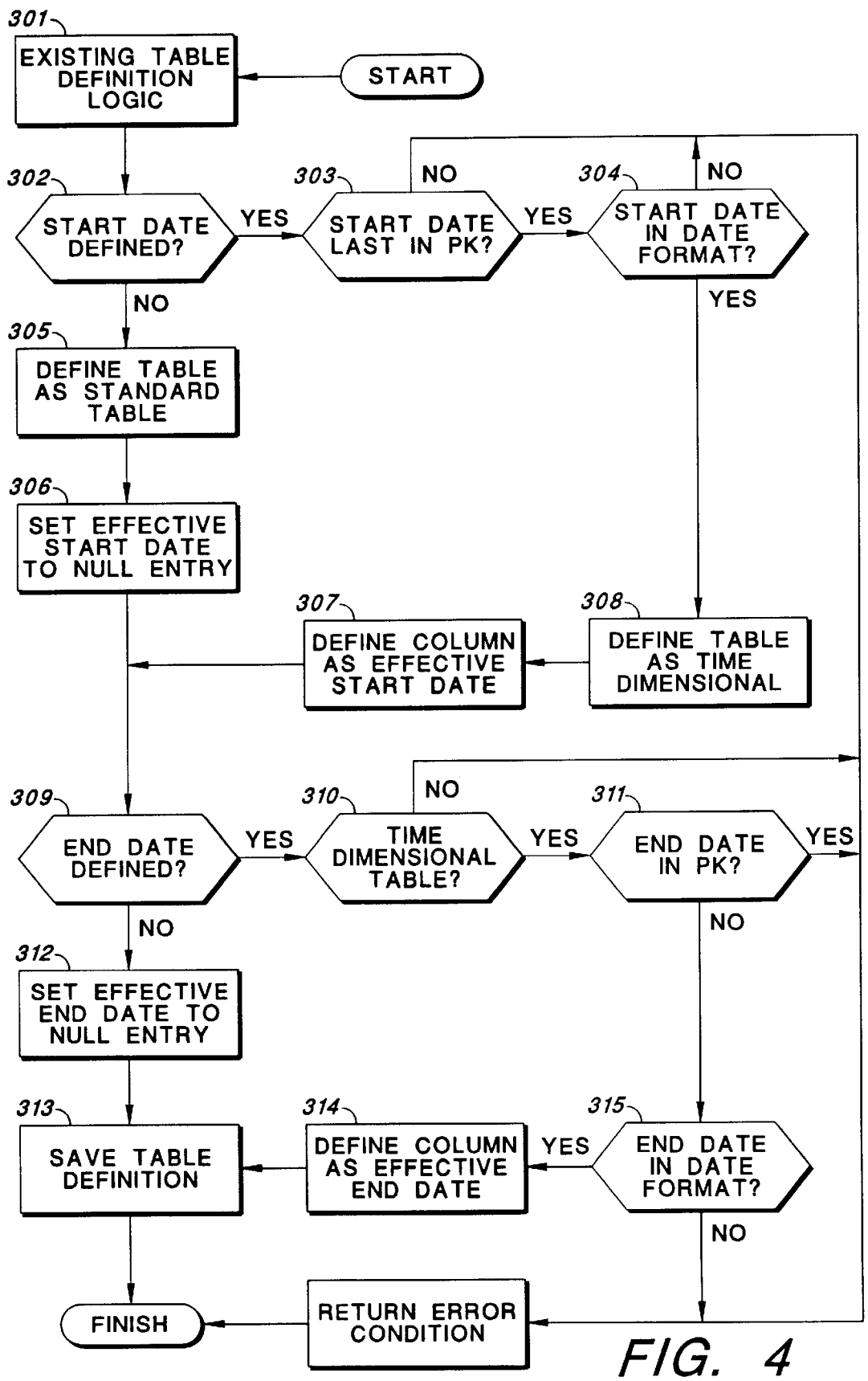
FIG. 4 is a flowchart showing the logic added to the table definition process in the preferred embodiment.

Referring to FIG. 4, a table definition process of the preferred embodiment is shown in flowchart form. An existing table definition process such as those known I in the art is modified to maintain the table type indicator and to maintain the effective start and end dates for time-dimensional tables. Edits are also performed which validate the columns identified as the effective start and end dates. In the preferred embodiment, an effective start date is identified in a table definition statement by the inclusion of the phrase "EFFECTIVE START DATE IS column-name". The name of a column in the time-dimensional table that is defined with a data type containing a date replaces the "column-name" parameter in the phrase. Any table defined with an effective start date is assumed to be a time-dimensional table. An effective end date is identified in the table definition statement by the inclusion of the phrase "EFFECTIVE END DATE IS column-name". Here again the "column-name" is replaced by the name of a column in the table that is defined with a data type that contains a date. In the preferred embodiment, any column name identified as the effective start date must be the last column defined in the primary key of the time-dimensional table. Also in the preferred embodiment, the column identified as the effective end date may not participate in the primary key of the table.

In practice, the Existing Table Definition Logic 301 of a database management system executes and control is then passed to condition 302, which determines whether an effective start date column has been identified for the table. This would be indicated by the inclusion of the "EFFECTIVE START DATE IS column-name" phrase in the table definition text. If the phrase does not appear, control is passed to block 305, which registers the table as a standard or non-time-dimensional table by placing an "S" in the table type column of the temporary table buffer. Control is then passed to block 306 which places a null entry in the effective start date column of the temporary table buffer. Control is then passed to condition 309, which is described later. If condition 302 determines that an effective start date has been identified for the table, control is passed to condition 303. Condition 303 verifies that the column named as the effective start date appears as the last column in the primary key of the table. If this is not the case, the table definition is rejected and an error is returned. If condition 303 determines that the column named as the effective start date is the last column in the primary key of the table, control is passed to condition 304. Condition 304 then verifies that the data type of the column named as the effective start date is of a data type which contains a date. If condition 304 determines that the column identified as the effective start date is not of a data type which contains a date, the table definition is rejected and an error is returned. If condition 304 determines that the column is of a data type which contains a date, control is passed to block 308. Block 308 registers the table as a time-dimensional table by placing a "T" in the table type column of the temporary table buffer. Control is then passed to block 307 which places the name of the column identified as the effective start date in the effective start date column of the temporary table buffer. Control is then passed to condition 309.

When condition 309 receives control from block 306 or block 307, it will determine whether an effective end date has been identified for the table. This would be indicated by the inclusion of the "EFFECTIVE END DATE IS column-name" phrase in the table definition text. If the phrase does not appear, control is passed to block 312. Block 312 places a null entry in the effective end date column of the temporary table buffer. The temporary table buffer is then added to the catalog database in block 313. If condition 309 determines that an effective end date column has been identified for the table, control is passed to condition 310. Condition 310 will then determine if the table has been defined as a time-dimensional table in block 307. If condition 310 determines that the table is not time-dimensional, the table definition is rejected and an error is returned stating that an effective end date may only be specified for time-dimensional tables. If condition 310 determines that the table is time-dimensional, control is passed to condition 311. Condition 311 will then determine if the column identified appears in the primary key of the table. If it does, the table definition is rejected and an error is returned stating that effective end date columns may not participate in the primary keys of time-dimensional tables. If the effective end date column does not appear in the primary key, control is passed to condition 315. Condition 315 will then determine whether the column identified as the effective end date of the table is of a data type which contains a date. If it is not, the table definition is rejected and an error is returned. If the column identified as the effective end date is of a data type containing a date, control is passed to block 314. Block 314 will then place the name of the column identified as the effective end date in the effective end date column of the temporary table buffer. The temporary table buffer is then added to the catalog database in block 313.

A pseudo-code representation of the Table Definition Process flowchart shown in FIG. 4 follows:

| TABLE DEFINITION PROCESS |
|---|
| PERFORM EXISTING TABLE DEFINITION LOGIC.<br>IF THE TABLE DEFINITION CONTAINS 'EFFECTIVE START DATE IS'<br>  IF THE IDENTIFIED COLUMN IS THE LAST COLUMN IN THE PRIMARY KEY<br>    IF THE IDENTIFIED COLUMN IS OF A DATA TYPE WHICH CONTAINS A DATE<br>      MOVE 'T' TO THE TABLE TYPE COLUMN<br>      MOVE THE COLUMN NAME TO THE EFFECTIVE START DATE COLUMN<br>    ELSE<br>      RETURN ERROR (EFFECTIVE START DATE COLUMN DATA TYPE MUST HAVE A DATE)<br>    END-IF<br>  ELSE<br>    RETURN ERROR (START DATE MUST BE THE LAST COLUMN IN THE PRIMARY KEY)<br>  END-IF<br>ELSE<br>  MOVE 'S' TO THE TABLE TYPE COLUMN<br>  MOVE A NULL ENTRY TO THE EFFECTIVE START DATE COLUMN<br>END-IF.<br>IF THE TABLE DEFINITION CONTAINS 'EFFECTIVE END DATE IS'<br>  IF THE TABLE TYPE COLUMN CONTAINS A 'T'<br>    IF THE IDENTIFIED COLUMN PARTICIPATES IN THE PRIMARY KEY<br>      RETURN ERROR (END DATE COLUMN MAY NOT PARTICIPATE IN THE PRIMARY KEY)<br>    ELSE<br>      IF THE IDENTIFIED COLUMN IS OF A DATA TYPE WHICH CONTAINS A DATE<br>        MOVE THE COLUMN NAME TO THE EFFECTIVE END DATE COLUMN<br>      ELSE<br>        RETURN ERROR (EFFECTIVE END DATE COLUMN DATA TYPE MUST HAVE A DATE)<br>      END-IF<br>    END-IF<br>  ELSE<br>    RETURN ERROR (END DATE MAY ONLY BE USED IN TIME-DIMENSIONAL TABLES)<br>  END-IF<br>ELSE<br>  MOVE A NULL ENTRY TO THE EFFECTIVE END DATE COLUMN<br>END-IF.<br>SAVE TABLE DEFINITION.<br>RETURN. (TABLE DEFINITION COMPLETED SUCCESSFULLY) |

Foreign Key Definition Process

Referring to FIG. 5, the Foreign Key Definition process in the preferred embodiment is shown in flowchart form. In the preferred embodiment, an effective start date and an effective end date may be identified for any foreign key that identifies a time-dimensional table as its parent. An existing foreign key definition process of the data base management system is modified to maintain the effective start and end dates for time-dimensional referential constraints. Edits are performed that ensure that the dependent table columns identified as the effective start and end dates are appropriate for time-dimensional use. Foreign keys which do not name time-dimensional tables as parents may not identify an effective start date or an effective end date. An effective start date is identified in the foreign key definition statement by the inclusion of the phrase "EFFECTIVE START DATE IS column-name". The name of a column in the dependent table replaces the "column-name" parameter in the phrase. An effective end date is identified in the foreign key definition statement by the inclusion of the phrase "EFFECTIVE END DATE IS column-name". Here again the "column-name" is replaced by the name of a column in the dependent table. In the preferred embodiment, the list of dependent table columns in the foreign key must correspond to the logical primary key of the parent table. This represents a change from the current method employed in database management systems, which requires that the list of dependent columns correspond to the physical primary key of the parent table.

The Existing Foreign Key Definition Process of the database management system 401 executes and control is passed to block 402 which retrieves the first or next column from the primary key of the table identified as the parent in the relationship. Control is then passed to condition 403 which determines whether a column was retrieved in block 402. If a column was not retrieved, it can be assumed that the columns in the foreign key correspond to the columns in the primary key of the parent table. In this case, control is passed to condition 404, which determines whether the parent table is a time-dimensional table. If the parent is time-dimensional, the foreign key is rejected and an error is returned stating that the effective start date of a time-dimensional table cannot correspond to a column listed in a foreign key definition. If condition 404 determines that the parent table is not time-dimensional, control is passed to block 409. Block 409 then places a null entry in the effective start date column of the temporary foreign key buffer. Control is then passed to block 415 which places a null entry in the effective end date column of the temporary foreign key buffer. Control is then passed to block 421 which adds the foreign key to the catalog database from the temporary foreign key buffer.

If condition 403 determines that a column of the parent table primary key was retrieved in block 402, control is passed to block 407. Block 407 retrieves a column from the list of dependent table columns in the foreign key definition. Control is then passed to condition 406. Condition 406 determines whether a foreign key column was retrieved in block 407. If a foreign key column was retrieved, control is passed back to block 402. Block 402, condition 403, block 407, and condition 406 are processed recursively until condition 403 determines that all columns in the parent table primary key have been processed or until condition 406 determines that all dependent table columns listed in the foreign key definition have been processed.

If condition 406 determines that a foreign key column was not retrieved by block 407, control is passed to condition 405. Condition 405 then determines whether the parent in the relationship is a time-dimensional table. If it is not, the foreign key definition is rejected and an error is returned. If condition 405 determines that the parent is a time-dimensional table, control is passed to block 408. Block 408 then attempts to retrieve the next column in the primary key of the parent table. Control is then passed to condition 410 which determines whether an additional column was retrieved from the primary key of the parent table in block 408. If it was, the foreign key definition is rejected and an error is returned. If an additional column could not be retrieved from the primary key of the parent table, control is passed to condition 411. Condition 411 then determines whether an effective start date column has been identified for the foreign key. This would be indicated by the inclusion of the "EFFECTIVE START DATE IS column-name" phrase in the foreign key definition text. If an effective start date has not been identified, control is passed to block 412 which places a null entry in the effective start date column of the temporary foreign key buffer. Control is then passed to condition 417, which is described below. If condition 411 determines that an effective start date column has been identified for the foreign key, control is passed to condition 413. Condition 413 determines whether the dependent table column identified as the effective start date is of a data type which contains a date. If it is not, the foreign key definition is rejected and an error is returned. If the dependent table column identified as the effective start date is of a data type which contains a date, control is passed to block 414. Block 414 then places the name of the dependent table column in the effective start date column of the temporary foreign key buffer. Control is then passed to condition 417.

When control is passed to condition 417 from block 412 or block 414, it will determine whether and effective end date has been identified for the foreign key. This would be indicated by the inclusion of the "EFFECTIVE END DATE IS column-name" phrase in the foreign key definition text. If an effective end date has not been identified for the foreign key, control is passed to block 418. Block 418 will then place a null entry in the effective end date column of the temporary foreign key buffer. Control is then passed to block 421, which adds the foreign key to the catalog database from the temporary foreign key buffer. If condition 417 determines that an effective end date is identified for the foreign key, control is passed to condition 416. Condition 416 determines whether the effective start date column of the temporary foreign key buffer contains a null entry. If it does, the foreign key definition is rejected and an error is returned stating that an effective end date cannot be identified without an effective start date. If condition 416 determines that an effective start date has been identified for the foreign key, control is passed to condition 419. Condition 419 then determines whether the dependent table column identified as the effective end date is of a data type which contains a date. If it does not, the foreign key definition is rejected and an error is returned. If condition 419 determines that the dependent table column named as the effective end date is of a data type which contains a date, control is passed to block 420. Block 420 places the name of the dependent table column in the effective end date column of the temporary foreign key buffer. Control is then passed to block 421, which adds the foreign key to the catalog database from the temporary foreign key buffer.

A psuedocode representation of the Foreign Key Definition Process flowchart shown in FIG. 5 follows:

---

FOREIGN KEY DEFINITION PROCESS

```
PERFORM EXISTING FOREIGN KEY DEFINITION LOGIC.
RETRIEVE FIRST COLUMN IN PRIMARY KEY OF PARENT TABLE.
RETRIEVE FIRST COLUMN IN FOREIGN KEY DEFINITION.
REPEAT UNTIL NO MORE PARENT TABLE PRIMARY KEY COLUMNS ARE
FOUND
   OR UNTIL NO MORE FOREIGN KEY COLUMNS ARE FOUND
      RETRIEVE NEXT COLUMN IN PRIMARY KEY OF PARENT TABLE
      RETRIEVE NEXT COLUMN IN FOREIGN KEY DEFINITION
END-REPEAT.
IF NO MORE PARENT TABLE PRIMARY KEY COLUMNS
   IF PARENT TABLE IS TIME-DIMENSIONAL
      RETURN ERROR (EFFECTIVE START DATE COLUMN MAY NOT BE
INCLUDED IN LIST)
   ELSE
      PLACE NULL ENTRY IN EFFECTIVE START DATE COLUMN OF
BUFFER
      PLACE NULL ENTRY IN EFFECTIVE END DATE COLUMN OF
BUFFER
   END-IF
ELSE
   IF PARENT TABLE IS TIME-DIMENSIONAL
      RETRIEVE NEXT COLUMN IN PRIMARY KEY OF PARENT TABLE
      IF PARENT TABLE PRIMARY KEY COLUMN WAS RETRIEVED
         RETURN ERROR (COLUMNS DO NOT MATCH PARENT TABLE
LOGICAL PRIMARY KEY)
      ELSE
```

```
                    FOREIGN KEY DEFINITION PROCESS

IF AN EFFECTIVE START DATE COLUMN IS IDENTIFIED
        IF DEPENDENT TABLE COLUMN NAMED IS OF A DATE
DATA TYPE
            PLACE DEPENDENT TABLE COLUMN NAME IN START
DATE COLUMN OF BUFFER
        ELSE
            RETURN ERROR (EFFECTIVE START DATE COLUMN NOT
DATE DATA TYPE)
        END-IF
        ELSE
        PLACE NULL ENTRY IN EFFECTIVE START DATE COLUMN
OF BUFFER
        END-IF
        IF AN EFFECTIVE END DATE COLUMN IS IDENTIFIED
        IF EFFECTIVE START DATE COLUMN OF BUFFER
CONTAINS NULL ENTRY
            RETURN ERROR (END DATE CANNOT BE IDENTIFIED
WITHOUT START DATE)
        ELSE
            IF DEPENDENT TABLE COLUMN NAMED IS OF A DATE
DATA TYPE
                PLACE DEPENDENT COLUMN NAME IN END DATE
COLUMN OF BUFFER
            ELSE
                RETURN ERROR (EFFECTIVE END DATE COLUMN
NOT DATE DATA TYPE)
            END-IF
        END-IF
        ELSE
        PLACE NULL ENTRY IN EFFECTIVE END DATE COLUMN OF
BUFFER
        END-IF
      END-IF
    ELSE
      RETURN ERROR (COLUMNS DO NOT MATCH THE PRIMARY KEY OF
THE PARENT)
    END-IF
END-IF
SAVE FOREIGN KEY DEFINITION
RETURN. (FOREIGN KEY DEFINITION COMPLETED SUCCESSFULLY)
```

Insert Process

Referring to FIG. 6, the Insert process in the preferred embodiment is shown in flowchart form. The existing Insert process of the database management system is modified to include several edits related to time-dimensional processing. In the preferred embodiment, each row of a time-dimensional table has an effective window which identifies the range of dates on which the version is considered active. The effective window starts with, and includes, the effective start date of the row. The effective window ends with, but does not include, the effective end date. If an effective end date is not defined for a table or has a null entry for a row, the effective end date is assumed to be the effective start date of the next chronological row with the same logical primary key or the highest date value possible if a later row does not exist. The Insert process is modified to prohibit the overlapping of effective windows in time-dimensional tables. An edit is also added that ensures that the value of the effective start date is less than that of the effective end date. The Insert process includes logic that invokes referential integrity validation for the rows being inserted into any table that participates as the dependent in a foreign key relationship.

The Existing Insert Edit Process of the database management system 501 executes and control is then passed to condition 502. Condition 502 determines whether the table in which the row is being inserted is a time-dimensional table. If it is not, time-dimensional edits are bypassed and control is passed to block 509, which is discussed later. If condition 502 determines that the table is time-dimensional, control is passed to condition 503. Condition 503 then determines whether the table has been defined with an effective end date column. If it has not, control is passed to block 506 which selects the current rows of the table that have the same logical primary key and effective start date values. After block 506 has been executed, control is passed to condition 510, which is discussed below. If condition 503 determines that the table has been defined with an effective end date, control is passed to condition 504. Condition 504 then determines if the value for the effective end date of the row being inserted is a null entry. If it is, control is passed to block 507, which selects the current rows of the table that have the same logical primary key and which have effective windows which include the value of the effective start date for the row being inserted. After block 507 has been executed, control is passed to condition 510, which is discussed below. If condition 504 determines that a value has been entered for the effective end date of the current row, control is passed to condition 505. Condition 505 then determines whether the value of the effective start date is less than the value of the effective end date for the row being inserted. If it is not, the insert request is rejected and an error is returned. If it is, control is passed to block 508, which selects the current rows of the table whose effective window ranges overlap that of the row being inserted. After block 508 has been executed, control is passed to condition 510.

Figure 9A:
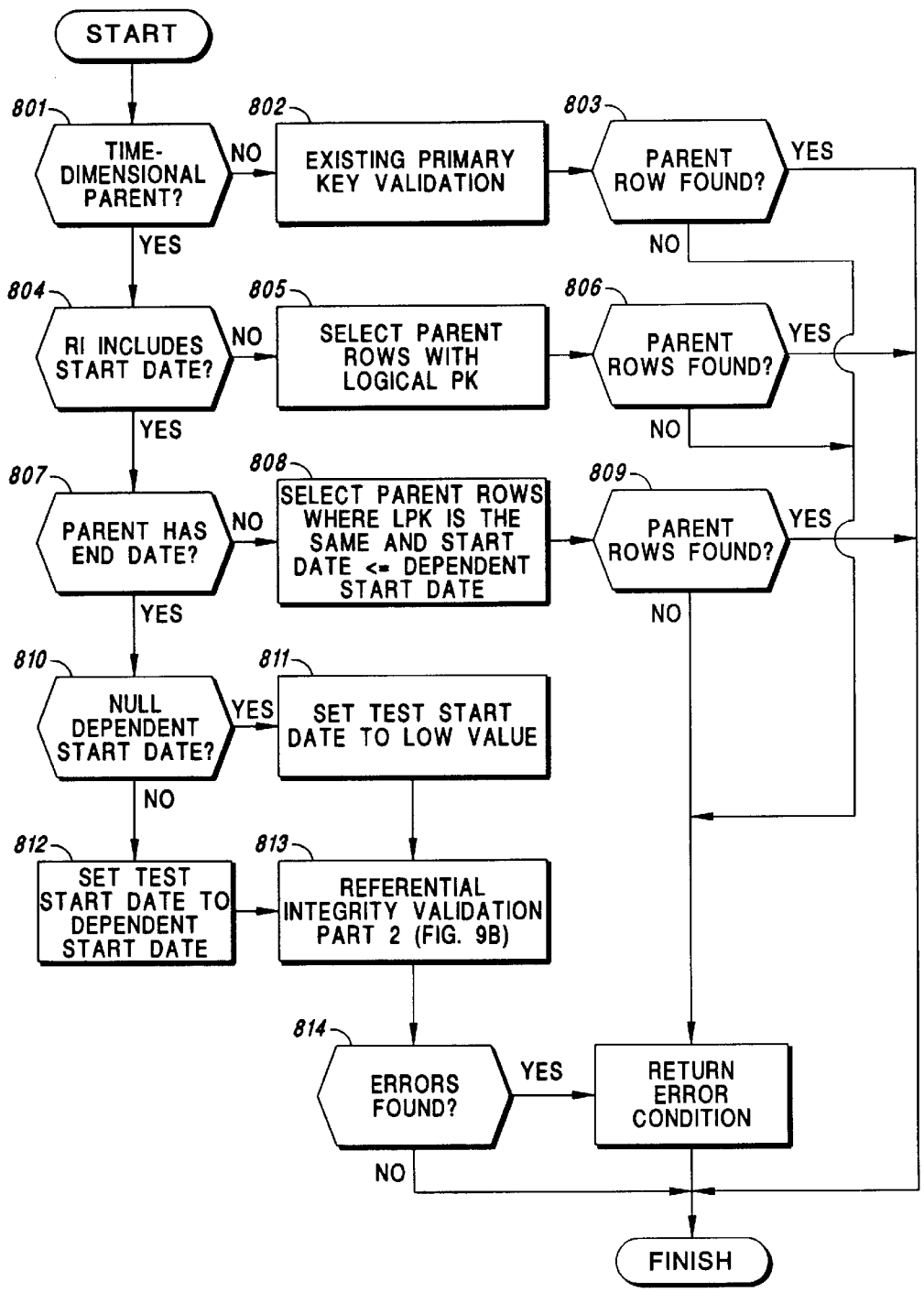
FIGS. 9A, 9B, and 9C are flowcharts showing the logic added to the referential integrity validation process in the preferred embodiment.

After condition 510 receives control from block 506, block 507, or block 508 it will determine whether rows were returned from the execution of the retrieval statements. If rows were retrieved, the insert request is rejected and an error is returned stating that the effective window of the row being inserted conflicts with those already existing on the database. If condition 510 determines that no existing rows conflict with the effective window of the row being inserted, control is passed to block 509. Block 509 then invokes a process that validates the referential integrity for the row being inserted. This process is shown in FIG. 9A. Referential integrity is validated for each foreign key in which the table participates as the dependent. After the referential integrity process is invoked in block 509, control is passed to condition 511. Condition 511 then determines if errors were returned by the process. If errors were returned, the insert request is rejected and the error passed by the process is returned. If no errors were returned by the referential integrity validation process, control is passed to condition 512. Condition 512 then determines whether the table participates as the dependent in any additional foreign key relationships. If so, control is passed back to block 509. Block 509, condition 511, and condition 512 are processed recursively until condition 511 determines that errors have been returned from the referential integrity validation process or until condition 512 determines that the table does not participate as the dependent in any more foreign key relationships. If condition 512 determines that there are no additional referential constraints to validate, the insert request is completed by adding the row to the table.

A psuedocode representation of the Insert Process flowchart shown in FIG. 6 follows:

| INSERT PROCESS |
|---|
| PERFORM EXISTING INSERT EDIT LOGIC.<br>IF THE TABLE IS TIME-DIMENSIONAL<br>  IF THE TABLE IS DEFINED WITH AN EFFECTIVE END DATE<br>    IF THE EFFECTIVE END DATE CONTAINS A NULL ENTRY<br>      PERFORM SELECT-ROWS-WHEN-END-IS-NULL<br>    ELSE<br>      IF EFFECTIVE START DATE < EFFECTIVE END DATE<br>        PERFORM SELECT-ROWS-WHEN-END-IS-NOT-NULL<br>    ELSE<br>      RETURN ERROR (START DATE MUST BE LESS THAN END DATE)<br>    END-IF<br>    END-IF<br>  ELSE<br>    PERFORM SELECT-ROWS-WHEN-END-DATE-NOT-DEFINED<br>  END-IF<br>  IF ROW COUNT > 0<br>    RETURN ERROR (ROW BEING INSERTED CONFLICTS WITH EXISTING ROWS)<br>  END-IF<br>END-IF.<br>RETRIEVE FIRST FOREIGN KEY RELATIONSHIP IN WHICH TABLE IS DEPENDENT<br>REPEAT UNTIL A FOREIGN KEY RELATIONSHIP CANNOT BE RETRIEVED<br>  PERFORM REFERENTIAL INTEGRITY VALIDATION (FIG. 9A)<br>  IF ERRORS ARE RETURNED<br>    RETURN ERROR (REFERENTIAL INTEGRITY HAS BEEN VIOLATED)<br>  END-IF<br>  RETRIEVE NEXT FOREIGN KEY RELATIONSHIP IN WHICH TABLE IS DEPENDENT<br>END-REPEAT.<br>INSERT ROW INTO DATABASE.<br>RETURN. (INSERT REQUEST COMPLETED SUCCESSFULLY)<br>SELECT ROWS-WHEN-END-IS-NULL.<br>SELECT COUNT(*) FROM TABLE<br>WHERE LOGICAL PRIMARY KEY IS THE SAME AS THAT BEING INSERTED<br>  AND (START DATE IS THE SAME AS THAT BEING INSERTED<br>  OR (START DATE IS LESS THAN THAT BEING INSERTED<br>  AND END DATE IS GREATER THAN THE START DATE BEING INSERTED))<br>RETURN.<br>SELECT ROWS-WHEN-END-IS-NOT-NULL.<br>SELECT COUNT(*) FROM TABLE<br>WHERE LOGICAL PRIMARY KEY IS THE SAME AS THAT BEING INSERTED<br>  AND (START DATE IS THE SAME AS THAT BEING INSERTED<br>  OR (START DATE IS GREATER THAN THAT BEING INSERTED<br>  AND START DATE IS LESS THAN THE END DATE BEING INSERTED)<br>  OR (START DATE IS LESS THAN THAT BEING INSERTED<br>  AND END DATE IS GREATER THAN THE START DATE BEING INSERTED))<br>RETURN.<br>SELECT ROWS-WREN-END-IS-NOT-DEFINED<br>SELECT COUNT(*) FROM TABLE<br>WHERE LOGICAL PRIMARY KEY IS THE SAME AS THAT BEING INSERTED<br>  AND START DATE IS THE SAME AS THAT BEING INSERTED<br>RETURN. |

Delete Process

Referring to FIG. 7, the Delete process in the preferred embodiment is shown in flowchart form. The Delete process is modified to include logic that invokes a time-dimensional referential integrity dependency check process. This process will determine whether a request to delete a row would cause dependent rows to violate their referential constraints. If the table from which a row is being deleted participates as the parent in any foreign key relationships, the rows of the dependent table in that relationship are validated to ensure that the deletion would not cause them to violate the referential constraint.

The Existing Delete Edit Logic 601 executes and control is then passed to condition 602. Condition 602 determines whether the table from which the row is being deleted is a time-dimensional table. If it is, control is passed to block 603 which executes the time-dimensional version of the referential integrity dependency check process. After the process is executed, control is passed to condition 604, which is discussed below. If condition 602 determines that the table is not time-dimensional, control is passed to block 605 which executes the existing non-time-dimensional version of the referential integrity dependency check process. After the process is executed, control is passed to condition 604.

When condition 604 receives control from block 603 or block 605, it determines whether errors were detected in the version of the referential integrity dependency check process executed. If errors were detected, the delete request is rejected and an error is returned stating that dependent rows would be orphaned if the request had been completed. If condition 604 determines that no errors were detected in the referential integrity dependency validation process, control is passed to block 606. Block 606 then removes the row from the database as specified in the request.

A psuedocode representation of the Delete Process flowchart shown in FIG. 7 follows:

a later date may cause the new effective window of the row to overlap those of existing rows with the same logical primary key in the time-dimensional table. An edit is added to the Update process to prevent overlapping effective windows. In the event that the value of an effective end date column is modified to a earlier date, the effective window of the row will be restricted to a smaller range of dates. An edit is added which determines whether the modification to the smaller effective window would cause dependent rows of referential constraints to be orphaned. Referential integrity validation is also invoked for all referential constraints in which the table being updated participates as the parent.

In FIG. 8A, the Existing Update Edit Logic 701 executes and control is then passed to condition 702. Condition 702 then determines whether an effective end date has been defined for the table being updated. If not, edits related to the modification of the effective end date are bypassed and control is passed to block 710, which is described below. If condition 702 determines that an effective end date has been defined for the table, control is passed to condition 703. Condition 703 then determines whether the value of the effective end date for the row being updated has changed. If not, edits related to the modification of the effective end date are bypassed and control is passed to block 710, which is described below. If condition 703 determines that the value of the effective end date column has been changed, control is passed to condition 704. Condition 704 then determines if the value of the effective start date for the row being updated is less than the value of the effective end date. If it is not, the update request is rejected and an error is returned. If the value of the effective start date is less than the value of the effective end date, control is passed to condition 705. Condition 705 then determines whether the effective end date is being changed to a date that is later than its original value. If it is, control is passed to block 706, which retrieves rows currently existing on the database which have the same

---

DELETE PROCESS

PERFORM EXISTING DELETE EDIT LOGIC.
IF THE TABLE IS TIME-DIMENSIONAL
   PERFORM TIME-DIMENSIONAL REFERENTIAL INTEGRITY DEPENDENCY CHECK (FIG. 10A)
ELSE
   PERFORM EXISTING REFERENTIAL INTEGRITY DEPENDENCY CHECK
END-IF.
IF ERRORS ARE FOUND
   RETURN ERROR (DEPENDENT ROWS WOULD BE ORPHANED)
END-IF.
DELETE ROW FROM DATABASE.
RETURN. (DELETE REQUEST COMPLETED SUCCESSFULLY)

---

Update Process

Referring to FIG. 8A and FIG. 8B, the Update process in the preferred embodiment is shown in flowchart form. In the preferred embodiment, the effective end date column of a time-dimensional table does not participate in the primary key. It is therefore possible to modify the value of the effective end date column for an existing row. The Update process is modified to ensure that any new value for an effective end date column is greater than the value of the effective start date column of that row. In addition, the modification of the value of the effective end date column to logical primary key as the row being updated and whose effective windows overlap with that of the row being updated. Control is then passed to condition 708, which determines whether any rows were retrieved in block 706, If so, the update request is rejected and an error is returned which, states that the proposed update would have caused an effective window overlap. If condition 708 determines that no rows were retrieved in block 706, control is passed to block 710, which is described later. If condition 705 determines that the effective end date is being changed to a value that is earlier than its original value, control is passed to block 707. Block 707 executes the time-dimensional referential integrity dependency check shown in FIG. 10A, which validates that dependent rows in the foreign key relationship would not be orphaned by the proposed change. After block 707 has executed, control is passed to condition 710, which determines whether errors have been returned by the referential integrity dependency check. If errors have been detected, the update request is rejected and an error is returned stating that the proposed changed would have caused dependent rows to be orphaned. If condition 710 determines that no errors were detected, control is passed to block 709.

When block 709 receives control from condition 702, condition 703, condition 708, or condition 710, it executes the portion of the Update process shown in FIG. 8B which validates the referential constraints in which the table being updated participates as a dependent. After the second part of the Update process has been executed, control is passed to condition 711. Condition 711 then determines whether errors have been returned from the execution of the second part of the Update process. If errors have been returned, the update request is rejected and an error is returned stating that the proposed changes would violate a referential constraint. If condition 711 determines that no errors have been returned, control is passed to block 712, which updates the row on the database as specified in the request.

In FIG. 8B, condition 751 determines whether the columns listed in a foreign key definition in which the table being updated participates as a dependent have been modified. If so, control is passed to block 756, which executes the referential integrity validation process shown in FIG. 9A. If condition 751 determines that the columns listed in the foreign key definition have not been modified, control is passed to condition 752. Condition 752 then determines whether the referential constraint has been defined with an effective start date. If not, referential integrity validation is bypassed and control is passed to condition 757 which determines whether the table being updated participates as a dependent in any additional foreign key relationships. If condition 752 determines that the referential constraint has been defined with an effective start date, control is passed to condition 753. Condition 753 then determines whether the value of the effective start date has been modified. If so, control is passed to block 756, which executes the referential integrity validation process shown in FIG. 9A. If condition 753 determines that the value of the effective start date has not been changed, control is passed to condition 754. Condition 754 then determines whether the referential constraint has been defined with an effective end date. If not referential integrity validation is bypassed and control is passed to condition 757 which determines whether the table being updated participates as a dependent in any additional foreign key relationships. If condition 754 determines that the referential constraint has been defined with an effective end date, control is passed to condition 755. Condition 755 then determines whether the value of the effective end date has been modified. If it has, control is passed to block 756 which executes the referential integrity validation process shown in FIG. 8A. If it has not, control is passed to condition 757 which determines whether the table being updated participates as a dependent in any additional foreign key relationships.

When block 756 receives control from condition 751, condition 753, or condition 755, it executes the referential integrity validation process shown in FIG. 9A. This process will determine whether the modifications made to the row would violate any referential constraints. After the referential integrity validation process has been invoked in block 756, control is passed to condition 758 which determines whether any errors have been returned. If errors have been detected, they are returned to the main portion of the Update process shown in FIG. 9A, which will cause the update request to be rejected. If errors have not been detected, control is passed to condition 757.

When condition 757 receives control from condition 752, condition 754, condition 755, or condition 758, it determines whether the table being updated participates as a dependent in any additional referential constraints that have not been processed. If condition 757 determines that there are additional referential constraints to be processed, control is passed back to condition 751. Condition 751 through condition 758 are processed recursively until an error is detected in condition 758 or until condition 757 determines that all referential constraints have been processed. If condition 757 determines that all referential constraints in which the table being updated participates as a dependent have been processed, control is returned to the main portion of the Update process shown in FIG. 8A.

A psuedocode representation of the Update Process flowchart shown in FIG. 8A and FIG. 8B follows:

---

UPDATE PROCESS

---

PERFORM EXISTING UPDATE EDIT LOGIC.
IF TABLE BEING UPDATED HAS BEEN DEFINED WITH AN EFFECTIVE END DATE
  IF EFFECTIVE END DATE HAS BEEN MODIFIED
    IF EFFECTIVE START DATE IS LESS THAN EFFECTIVE END DATE
      IF THE NEW END DATE IS GREATER THAN THE END DATE PRIOR TO CHANGE
        PERFORM SELECT-ROWS-WITH-OVERLAPPING-EFFECTIVE-WINDOWS
          IF ROW COUNT > 0
            RETURN ERROR (UPDATE WOULD CAUSE EFFECTIVE WINDOW OVERLAP)
          END-IF
        ELSE

-continued

| UPDATE PROCESS |
|---|
| RETRIEVE FIRST REFERENTIAL CONSTRAINT WHERE TABLE IS PARENT<br>REPEAT UNTIL NO MORE REFERENTIAL CONSTRAINTS ARE FOUND<br>    IF THE REFERENTIAL CONSTRAINT HAS AN EFFECTIVE END DATE<br>        PERFORM REFERENTIAL INTEGRITY DEPENDENCY CHECK (FIG. 10A)<br>        IF ERRORS ARE RETURNED<br>            RETURN ERROR (UPDATE WOULD CAUSE ROWS TO BE ORPHANED)<br>        END-IF<br>        END-IF<br>        RETRIEVE NEXT REFERENTIAL CONSTRAINT WHERE TABLE IS PARENT<br>    END-REPEAT<br>    END-IF<br>  ELSE<br>    RETURN ERROR (EFFECTIVE START DATE MUST BE LESS THAN END DATE)<br>    END-IF<br>  END-IF<br>END-IF.<br>RETRIEVE FIRST REFERENTIAL CONSTRAINT WHERE TABLE IS DEPENDENT<br>REPEAT UNTIL NO MORE REFERENTIAL CONSTRAINTS ARE FOUND<br>  IF THE VALUES OF ANY COLUMNS LISTED IN THE FOREIGN KEY ARE CHANGED<br>    PERFORM REFERENTIAL INTEGRITY VALIDATION (FIG. 8A)<br>    IF ERRORS ARE RETURNED<br>      RETURN ERROR (CHANGES VIOLATE REFERENTIAL CONSTRAINT)<br>    END-IF<br>  ELSE<br>    IF REFERENTIAL CONSTRAINT HAS BEEN DEFINED WITH AN EFFECTIVE START DATE<br>      IF THE VALUE OF THE EFFECTIVE START DATE HAS CHANGED<br>        PERFORM REFERENTIAL INTEGRITY VALIDATION (FIG. 8A)<br>        IF ERRORS ARE RETURNED<br>          RETURN ERROR (CHANGES VIOLATE REFERENTIAL CONSTRAINT)<br>        END-IF<br>        ELSE<br>        IF REFERENTIAL CONSTRAINT HAS BEEN DEFINED WITH AN END DATE<br>          IF THE VALUE OF THE EFFECTIVE END DATE HAS CHANGED<br>            PERFORM REFERENTIAL INTEGRITY VALIDATION (FIG. 8A)<br>            IF ERRORS ARE RETURNED<br>              RETURN ERROR (CHANGES VIOLATE REFERENTIAL CONSTRAINT)<br>            END-IF<br>          END-IF<br>        END-IF<br>      END-IF<br>    END-IF<br>  END-IF<br>  RETRIEVE NEXT REFERENTIAL CONSTRAINT WHERE TABLE IS DEPENDENT<br>END-REPEAT.<br>UPDATE ROW IN DATABASE AS SPECIFIED.<br>RETURN. (UPDATE REQUEST COMPLETED SUCCESSFULLY)<br>SELECT-ROWS-WITK-OVERLAPPING-EFFECTIVE-WINDOWS<br>SELECT COUNT(\*) FROM TABLE<br>WHERE LOGICAL PRIMARY KEY IS THE SAME AS THAT BEING UPDATED<br>  AND (START DATE IS THE SAME AS THAT BEING UPDATED<br>  OR (START DATE IS GREATER THAN THAT BEING UPDATED<br>  AND START DATE IS LESS THAN THE END DATE BEING UPDATED)<br>  OR (START DATE IS LESS THAN THAT BEING UPDATED<br>  AND END DATE IS GREATER THAN THE START DATE BEING UPDATED))<br>RETURN. |

Referential Integrity Validation Process

Figure 9B:
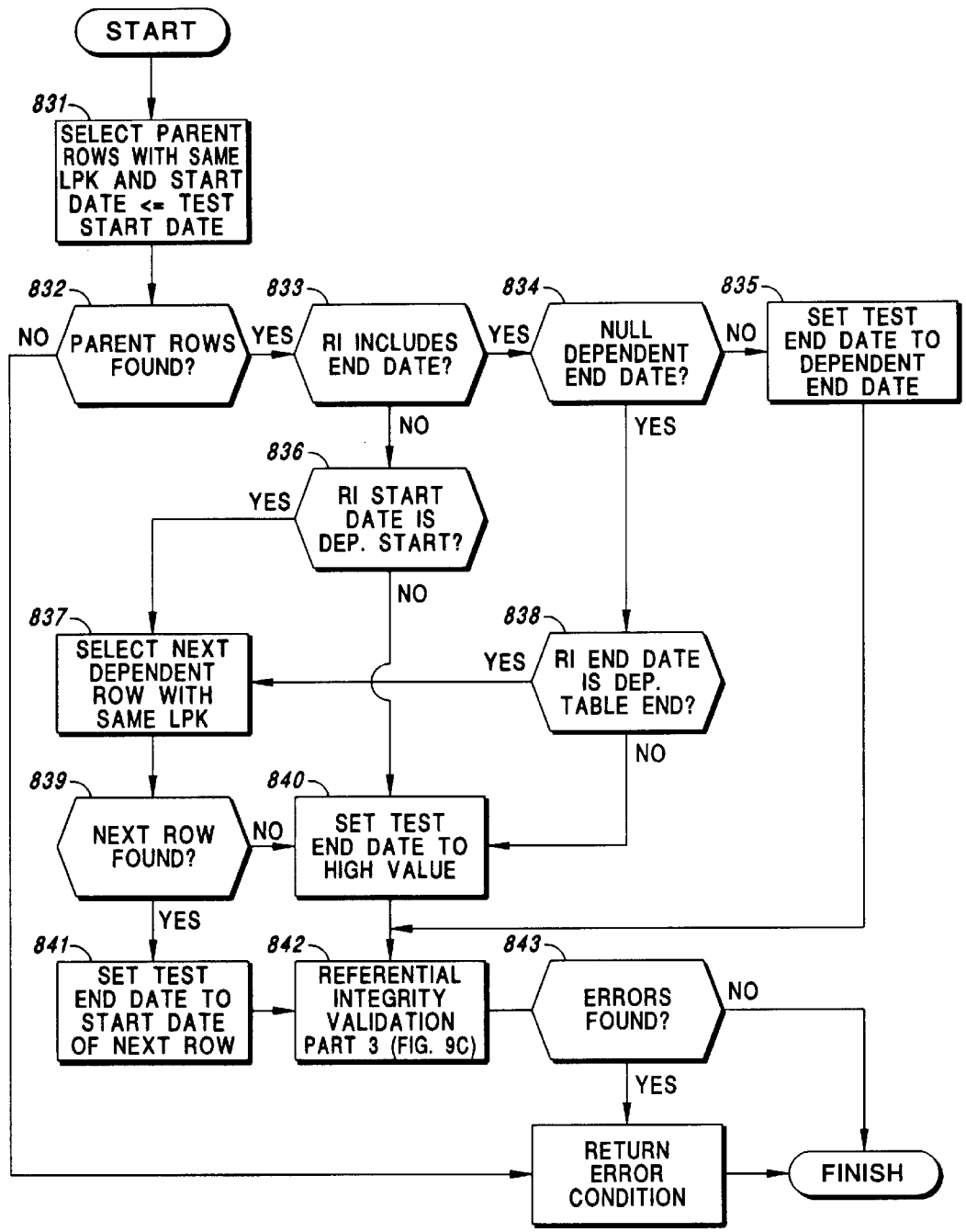
Figure 9C:
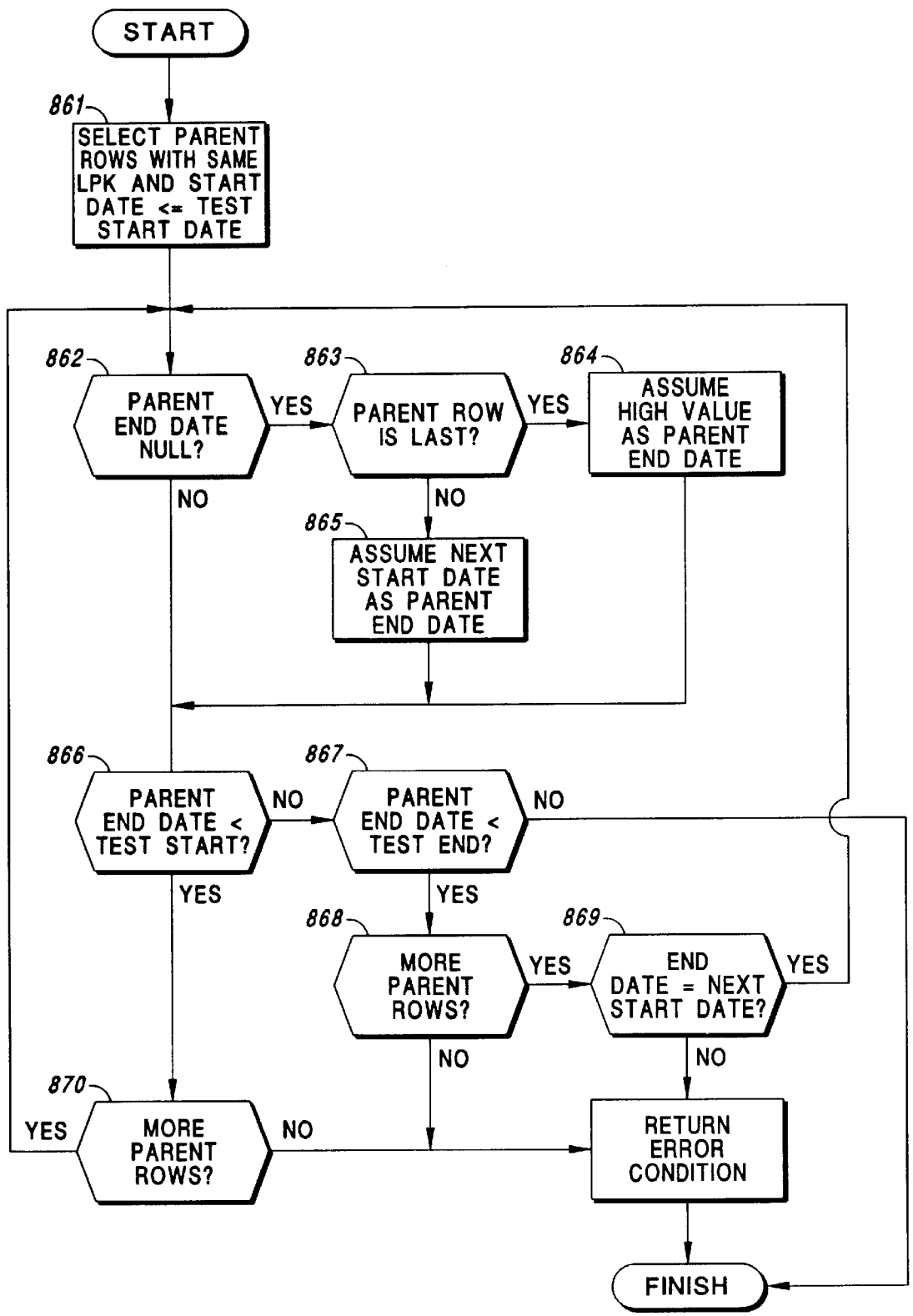

Referring to FIG. 9A, FIG. 9B, and FIG. 9C, the Referential Integrity Validation process in the preferred embodiment is shown in flowchart form. The Referential Integrity Validation process is invoked by the Insert process FIG. 6 or by the Update process FIG. 8B when changes occur to the values of a dependent row which warrant the validation. The Referential Integrity Dependency Check process FIG. 10B may also invoke the Referential Integrity Validation Process if changes are made to the values of an existing parent row and dependent rows may be in violation of a referential constraint due to the change. When the Referential Constraint Validation process receives control, the parent table, the dependent table row, and the referential constraint to be validated are already known. The Referential Integrity Validation process is modified to validate time-dimensional referential constraints.

In the preferred embodiment, referential constraints which identify a time-dimensional table as the parent, are validated to ensure that parent table rows exist which are active for the duration of the effective window determined for each dependent row. The effective window for dependent rows is defined by the effective start date and effective end date columns of the foreign key definition. If a parent table is not time-dimensional, the existing referential constraint validation is performed, which ensures that a parent row exists with a primary key equal to the values of the columns listed in the foreign key definition. If the parent table is time-dimensional and the foreign key definition has been defined without an effective start date, the existence of any parent table row with a logical primary key equal to the values of the columns listed in the foreign key definition will satisfy the referential constraint. If the parent table is time-dimensional and it has been defined without an effective end date and the foreign key has been defined with an effective start date, the existence of any parent table row with a logical primary key equal to the values of the columns listed in the foreign key definition and that has an effective start date less than the value of the effective start date identified for the foreign key definition, will satisfy the referential constraint. If the parent table is time-dimensional and it has been defined with an effective end date and the foreign key has been defined with an effective start date, parent rows must exist that have a logical primary key equal to the values of the columns listed in the foreign key definition for the entirety of the effective window of the dependent row to satisfy the referential constraint. In this case, the dependent row effective window is determined by the values of the effective start date and effective end date columns defined in the foreign key definition. The set of parent table rows which have a logical primary key equal to the values of the columns listed in the foreign key definition is reviewed to ensure that a row is active for each date contained in the dependent row effective window. If so, the referential constraint is satisfied.

In FIG. 9A, condition 801 determines whether the parent table in the foreign key relationship is time-dimensional. If it is not, control is passed to block 802 which executes the existing referential constraint validation which retrieves a row from the parent table whose physical primary key matches the columns listed in the foreign key definition. Control is then passed to condition 803 which determines whether a row was retrieved in block 802. If a row was not found, an error is returned to the invoking process. If condition 803 determines that a parent row was retrieved, the constraint has been satisfied and control is returned to the invoking process. If condition 801 determines that the parent table is time-dimensional, control is passed to condition 804. Condition 804 then determines whether the foreign key definition identifies an effective start date column. If it does not, control is passed to block 805, which retrieves rows from the parent table whose logical primary keys match the columns listed in the foreign key definition. Control is then passed to condition 806, which determines whether any rows were retrieved in block 805. If no rows were retrieved, an error is returned to the invoking process. If condition 806 determines that parent rows were retrieved, the constraint has been satisfied and control is returned to the invoking process. If condition 804 determines that the foreign key definition identifies an effective start date column, control is passed to condition 807. Condition 807 then determines whether the parent table has been defined with an effective end date. If it has not, control is passed to block 808, which retrieves rows from the parent table whose logical primary keys match the columns listed in the foreign key definition and which have an effective start date which is less than or equal to the effective start date of the dependent row. Control is then passed to condition 809, which determines whether any rows were retrieved in block 808. If no rows were retrieved, an error is returned to the invoking process. If condition 809 determines that parent rows were retrieved, the constraint has been satisfied and control is returned to the invoking process. If condition 807 determines that the parent table in the foreign key relationship has been defined with an effective start date, control is passed to condition 810. Condition 810 then determines whether the dependent row contains a null entry for the effective start date column identified in the foreign key relationship. If it does, control is passed to block 811, which places the lowest possible date value in the test effective start date. If condition 810 determines that a null entry does not exist for the effective start date column identified in the foreign key definition, control is passed to block 812, which places the value in the test effective start date. The test effective start date set in block 811 or block 812 identifies the start of the effective window for the dependent row. After setting the test effective start date, block 811 or block 812 passes control to block 813. Block 813 then invokes the second part of the Referential Integrity Validation process which is shown in FIG. 9B. The second part of the Referential Integrity Validation process completes the identification of the dependent row effective window and validates that parent rows exist which are active for the duration of the effective window. After execution of the second part of the Referential Integrity Validation process, control is passed to condition 814. Condition 814 then determines whether errors were returned from the second part of the process. If so, an error is returned to the process which invoked the Referential Integrity Validation process. If condition 814 determines that errors were not returned, the referential constraint has been satisfied and control is returned to the invoking process.

In FIG. 9B, block 831 executes retrieving all rows from the parent table which have a logical primary key matching the values of the columns listed in the foreign key definition and which also have an effective start date less than or equal to the value of the dependent row column identified as the effective end date in the foreign key definition. Control is then passed to condition 832, which determines whether rows were retrieved in block 831. If no rows were retrieved, an error is returned to the first part of the Referential Integrity Validation process. If condition 832 determines that rows were retrieved in block 831, control is passed to condition 833. Condition 833 then determines whether an effective end date has been identified in the foreign key definition. If it has, control is passed to condition 834, which determines whether the value of the effective end date on the dependent row is a null entry. If it is not, control is passed to block 835, which places the value of the effective end date column from the dependent row into the test effective end date. Control is then passed to block 842, which is described below. If condition 834 determines that the value of the effective end date on the dependent row is a null entry, control is passed to condition 838. Condition 838 then determines whether the column identified as the effective end date of the foreign key definition is also defined as the effective end date of the dependent table definition. If it is not, control is passed to block 840, which places the highest possible date value into the test effective end date. Control is then passed to block 842, which is described below. If condition 838 determines that the effective end date column identified in the foreign key definition is also identified as the effective end date for the dependent table, control is passed to block 837, which is described below. If condition 833 determines that an effective end date column has not been identified in the foreign key definition, control is passed to condition 836. Condition 836 then determines whether the column identified as the effective start date in the foreign key definition has also been identified as the effective start date column in the dependent table definition. If it has not, control is passed to block 840, which places the highest possible date value in the test effective end date. Control is then passed to block 842, which is described below. If condition 836 determines that the column defined as the effective start date of the foreign key definition has also been defined as the effective start date of the dependent table definition, control is passed to block 837.

When block 837 receives control from condition 836 or condition 838, it retrieves the row of the dependent table which has the same logical primary key as the row being inserted or updated and which follows the row being inserted or updated in chronological order. Control is then passed to condition 839, which determines whether a dependent table row was retrieved in block 837. If a row was retrieved, control is passed to block 841, which places the value of the start date of the row retrieved into the test effective end date. Control is then passed to block 842, which is described below. If condition 839 determines that a row was not retrieved as a result of the execution of block 837, control is passed to block 840 which places the highest possible date value into the test effective end date. Control is then passed to block 840.

When block 840 receives control from block 835, block 840, or block 841, it invokes the third part of the Referential Integrity Validation process shown in FIG. 9C. The third part of the Referential Integrity Validation process validates that parent rows are active which have the same logical primary key as the columns listed in the foreign key definition for the duration of the dependent row effective window. After the process has been completed, control is passed to condition 843. Condition 843 then determines whether errors were returned from the third part of the Referential Integrity Validation process. If errors were detected, they are passed back to the first part of the Referential Integrity Validation process. If errors were not detected, the referential constraint has been satisfied and control is returned to the first part of the Referential Integrity Validation process.

In FIG. 9C, block 861 retrieves the values of the effective start date column and the effective end date column from the rows of the parent table where the logical primary key is equal to the values of the dependent table columns listed in the foreign key and where the parent effective start date is less than the test effective end date. The rows returned are sorted by the values of the effective start dates in ascending order. The result set from block 861 will be processed throughout the remainder of FIG. 9C. After block 861 has retrieved the date values from the parent table, control is passed to condition 862. Condition 862 then determines whether the value of the effective end date of a row of the result set is a null entry. If it is not, control is passed to condition 866 which is described later. If condition 862 determines that the value of the effective end date of a row of the result set is a null entry, control is passed to condition 863. Condition 863 then determines whether the last row in the result set is currently being processed. If it is, control is passed to block 864, which places the highest possible date value in the effective end date column of the result set row. Control is then passed to condition 866, which is described below. If condition 863 determines that the last row of the result set is not being processed, control is passed to block 865. Block 865 then places the value of the effective start date of the next row in the result set into the effective end date column of the result set row currently being processed. Control is then passed to condition 866.

When condition 866 receives control from condition 862, block 864, or block 865, it determines whether the value of the effective end date column of the result set row is less than the value of the test effective start date. If it is, control is passed to condition 870, which determines whether there are additional result set rows to process. If there are no more result set rows, the effective window of the dependent row is not fully covered by the rows of the parent table and an error is returned to the first part of the Referential Integrity Validation process. If rows remain to be processed in the result set, control is passed back to condition 862 and the process is repeated for the next row. If condition 866 determines that the value of the effective end date column of the result set row is greater than or equal to the value of the test effective start date, control is passed to condition 867. Condition 867 then determines whether the value of the effective end date column of the result set row is less than the value of the test effective end date column. If it is not, the effective window for the dependent row is fully covered by the rows of the parent table and control is passed back to the second part of the Referential Integrity Validation process. If condition 867 determines that the value of the effective end date column in the result set row is less than the value of the test effective end date column, control is passed to condition 868. Condition 868 then determines whether the last row in the result set is currently being processed. If it is not, the effective window of the dependent row is not fully covered by the rows of the parent table, and an error is returned to the second part of the Referential Integrity Validation process. If condition 868 determines that the last row in the result set is not being processed, control is passed to condition 869. Condition 869 then determines whether the value of the effective start date column of the next row in the result set is equal to the value of the effective end date in the row of the result set that is currently being processed. If it is not, the effective window of the dependent row is not fully covered by the rows of the parent table and an error is returned to the second part of the Referential Integrity Validation process. If condition 869 determines that the value of the effective start date column of the next row in the result set is equal to the value of the effective end date column of the row currently being processed, control is passed back to condition 862 and the process is repeated for the next row in the result set. The process from condition 862 through condition 869 is processed recursively until condition 868, condition 869, or condition 870 determines that the effective window is not fully covered or until condition 867 determines that the effective window has been fully covered.

A psuedocode representation of the Referential Integrity Validation Process flowchart shown in FIG. 9A, FIG. 9B, and FIG. 9C follows:

```
REFERENTIAL INTEGRITY VALIDATION PROCESS

IF THE PARENT TABLE IS TIME-DIMENSIONAL
  IF AN EFFECTIVE START DATE HAS BEEN IDENTIFIED FOR THE
FOREIGN KEY
    IF AN EFFECTIVE END DATE HAS BEEN IDENTIFIED FOR THE
PARENT TABLE
      IF THE FOREIGN KEY EFFECTIVE START DATE OF THE
DEPENDENT ROW IS NULL
        MOVE LOW DATE VALUE TO THE TEST EFFECTIVE START
DATE COLUMN
      ELSE
        MOVE THE FOREIGN KEY EFFECTIVE START DATE TO THE
TEST START DATE
      END-IF
      PERFORM VALIDATE-EFFECTIVE-WINDOW
      IF ERRORS ARE RETURNED
        RETURN ERROR (REFERENTIAL CONSTRAINT WOULD BE
VIOLATED)
      END-IF
    ELSE
      PERFORM SELECT-PARENTS-BY-START-DATE
      IF ROW COUNT IS EQUAL TO ZERO
        RETURN ERROR (REFERENTIAL CONSTRAINT WOULD BE
VIOLATED)
      END-IF
    END-IF
  ELSE
    PERFORM SELECT-PARENT-ROWS-BY-LOGICAL-PRIMARY
    IF ROW-COUNT IS EQUAL TO ZERO
      RETURN ERROR (REFERENTIAL CONSTRAINT WOULD BE
VIOLATED)
    END-IF
  END-IF
ELSE
  PERFORM REFERENTIAL CONSTRAINT VALIDATION USING PHYSICAL
PRIMARY (EXISTING)
  IF ERRORS ARE DETECTED
    RETURN ERROR (REFERENTIAL CONSTRAINT WOULD BE
VIOLATED)
  END-IF
END-IF
RETURN. (REFERENTIAL CONSTRAINT HAS NOT BEEN VIOLATED)
VALIDATE-EFFECTIVE-WINDOW.
PERFORM SELECT-PARENT-ROWS-LESS-THAN-EFFECTIVE-WINDOW..
IF ROW COUNT IS EQUAL TO ZERO
  RETURN ERROR (NO PARENT ROWS FOR EFFECTIVE START DATE)
ELSE
  IF EFFECTIVE END DATE IS DEFINED FOR FOREIGN KEY
    IF THE FOREIGN KEY EFFECTIVE END DATE OF THE DEPENDENT
ROW IS NULL
      IF THE FOREIGN KEY END DATE COLUMN IS DEPENDENT
TABLE END DATE
        PERFORM SELECT-NEXT-DEPENDENT-ROW
        IF NEXT DEPENDENT ROW FOUND
          MOVE NEXT DEPENDENT START DATE TO THE TEST
EFFECTIVE END DATE
        ELSE
          MOVE HIGH DATE VALUE TO THE TEST EFFECTIVE
```

REFERENTIAL INTEGRITY VALIDATION PROCESS

```
END DATE COLUMN
      END-IF
    ELSE
      MOVE HIGH DATE VALUE TO THE TEST EFFECTIVE END
DATE COLUMN
      END-IF
    MOVE FOREIGN KEY EFFECTIVE END DATE OF DEPENDENT ROW
TO TEST END DATE
    END-IF
  ELSE
    IF THE FOREIGN KEY START DATE COLUMN IS THE DEPENDENT
TABLE START DATE
      PERFORM SELECT-NEXT-DEPENDENT-ROW
      IF NEXT DEPENDENT ROW FOUND
        MOVE NEXT DEPENDENT START DATE TO THE TEST
EFFECTIVE END DATE
      ELSE
        MOVE HIGH DATE VALUE TO THE TEST EFFECTIVE END
DATE COLUMN
      END-IF
    ELSE
      MOVE HIGH DATE VALUE TO THE TEST EFFECTIVE END DATE
COLUMN
    END-IF
  END-IF
END-IF.
PERFORM SELECT-PARENT-ROWS-LESS-THAN-TEST-END.
RETRIEVE FIRST ROW IN RESULT SET.
REPEAT UNTIL ALL RESULT SET ROWS HAVE BEEN PROCESSED
  IF THE EFFECTIVE END DATE ON THE RESULT SET ROW CONTAINS
A NULL ENTRY
    IF THERE ARE NO MORE RESULT SET ROWS AFTER THE CURRENT
ONE
      MOVE HIGH DATE VALUE TO THE EFFECTIVE END DATE ON
THE RESULT SET ROW
    ELSE
      MOVE START DATE OF NEXT RESULT SET ROW TO END DATE
OF THE CURRENT ROW
    END-IF
  END-IF
  IF END DATE ONTHE RESULT SET ROW IS NOT LESS THAN THE
TEST START DATE
    IF THE END DATE ON THE RESULT SET ROW IS LESS THAN THE
TEST END DATE
      IF THERE ARE MORE ROWS AFTER THE CURRENT ROW IN THE
RESULT SET
        IF END DATE OF CURRENT ROW IS NOT EQUAL TO START
DATE OF NEXT ROW
          RETURN ERROR (DEPENDENT EFFECTIVE WINDOW NOT
FULLY COVERED)
        END-IF
      ELSE
        RETURN ERROR (DEPENDENT EFFECTIVE WINDOW NOT
FULLY COVERED)
      END-IF
    ELSE
      RETURN (DEPENDENT EFFECTIVE WINDOW IS COVERED BY
PARENT ROWS)
    END-IF
  END-IF
RETRIEVE NEXT ROW FROM RESULT SET
END-REPEAT.
RETURN ERROR. (RESULT SET ROWS EXHAUSTED BEFORE EFFECTIVE
WINDOW WAS COVERED)
SELECT-PARENT-ROWS-LESS-THAN-EFFECTIVE-WINDOW
SELECT COUNT(*) FROM PARENT TABLE
WHERE LOGICAL PRIMARY KEY = DEPENDENT TABLE FOREIGN KEY
VALUES
  AND PARENT TABLE START DATE <= TEST EFFECTIVE START DATE
SELECT-PARENT-ROWS-LESS-THEN-TEST-END.
SELECT EFFECTIVE START DATE, EFFECTIVE END DATE
FROM PARENT TABLE
WHERE LOGICAL PRIMARY KEY = DEPENDENT TABLE FOREIGN KEY
VALUES
AND PARENT EFFECTIVE START DATE <= TEST EFFECTIVE START
DATE
ORDER BY EFFECTIVE START DATE
SELECT-NEXT-DEPENDENT-ROW.
```

| REFERENTIAL INTEGRITY VALIDATION PROCESS |
| --- |
| SELECT EFFECTIVE START DATE FROM DEPENDENT TABLE
WHERE LOGICAL PRIMARY KEY IS THE SAME AS THE CURRENT ROW
   AND EFFECTIVE START DATE =
     (SELECT MIN(EFFECTIVE START DATE) FROM DEPENDENT TABLE
     WHERE LOGICAL PRIMARY KEY IS THE SAME AS THE CURRENT
ROW
    AND EFFECTIVE START DATE > EFFECTIVE START DATE OF
THE CURRENT ROW)
SELECT-PARENTS-BY-START-DATE.
SELECT COUNT(*) FROM PARENT TABLE
WHERE LOGICAL PRIMARY KEY = DEPENDENT TABLE FOREIGN KEY
VALUES
   AND PARENT EFFECTIVE START DATE <= DEPENDENT EFFECTIVE
START DATE
SELECT-PARENT-ROWS-BY-LOGICAL-PRIMARY
SELECT COUNT(*) FROM PARENT TABLE
WHERE LOGICAL PRIMARY KEY = DEPENDENT TABLE FOREIGN KEY
VALUES |

Referential Integrity Dependency Check Process

Figure 10A:
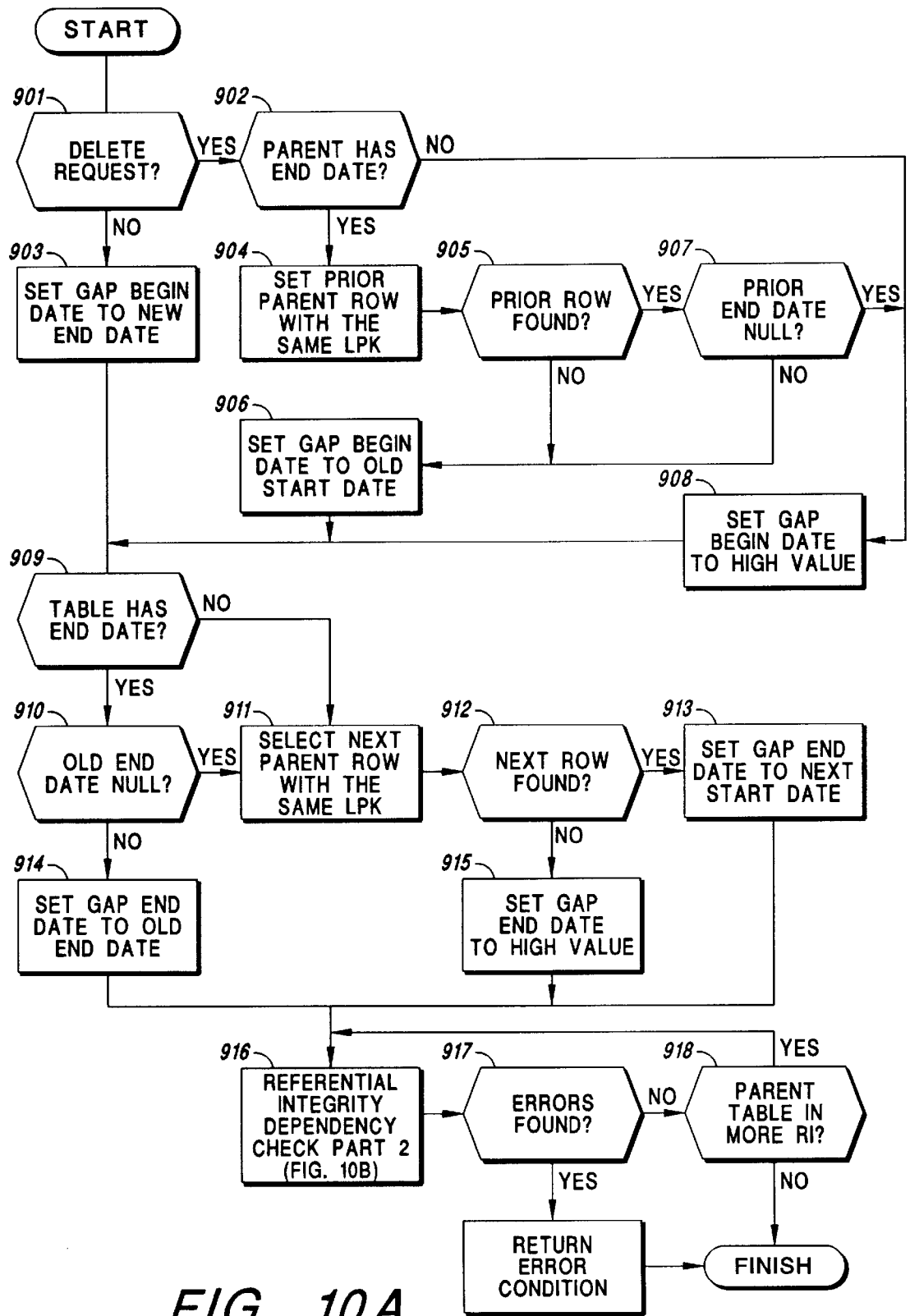
FIGS. 10A and 10B are flowcharts showing the logic added to the referential integrity dependency check process in the preferred embodiment.
Figure 10B:
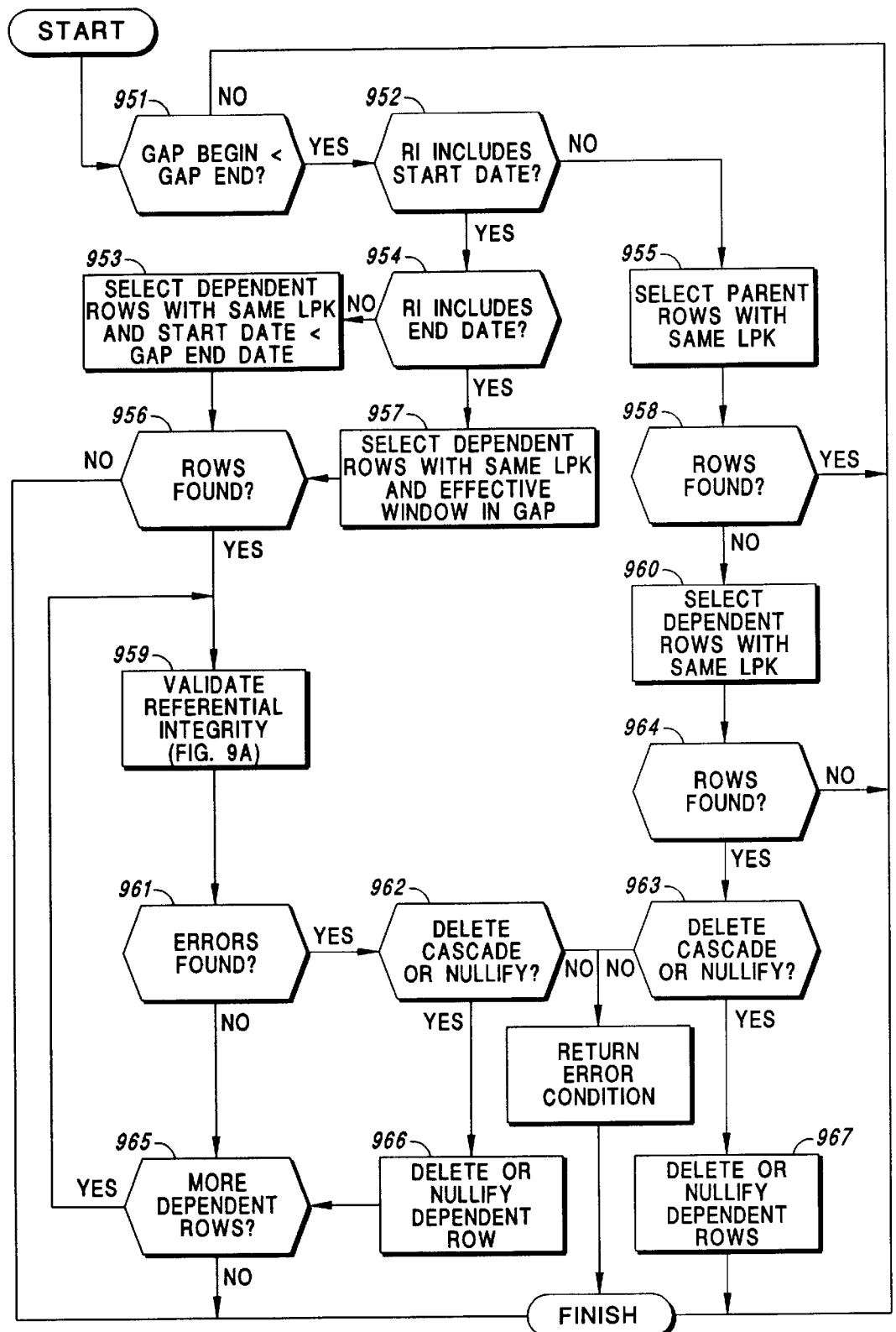

Referring to FIG. 10A, and FIG. 10B, the Referential Integrity Dependency Check process in the preferred embodiment is shown in flowchart form. The Referential Integrity Dependency Check process is invoked by the Update process FIG. 8A or the Delete process FIG. 7 when changes are proposed to an existing parent table row which may leave dependent rows orphaned. If the effective window of a time-dimensional parent table row is shortened through an update or removed completely through deletion, any dependent rows which require the portion of the effective window that is being removed will be in violation of their referential constraints. The Referential Integrity Dependency Check process is modified to prevent this situation from occurring. In the preferred embodiment, a gap window is defined which identifies the range of dates for which the parent row is no longer effective. Dependent rows in each referential constraint in which the table being updated or deleted participates as the parent are checked to determine if any of the dependent rows require the portion of the effective window identified by the gap window. If any dependent rows require that portion of the effective window, the appropriate action is taken based on the delete option defined in the referential constraint.

In FIG. 10A, condition 901 determines whether the command being processed is a delete command. If it is not, the command being processed is an update to the effective window of a parent table row and control is passed to block 903. Block 903 then sets the begin date of the gap window to the new end date specified in the update request. Control is then passed to condition 909, which is described below. If condition 901 determines that the request being processed is a delete command, control is passed to condition 902. Condition 902 then determines whether the parent table has been defined with an effective end date. If it has not, control is passed to block 908, which sets the begin date of the gap window to the highest possible date value. Control is then passed to condition 909, which is described below. If condition 902 determines that an effective end date has been defined for the parent table, control is passed to block 904. Block 904 then selects the parent row with the same logical primary key as the row being deleted and which immediately precedes it in chronological order. After block 904 has completed, control is passed to condition 905 which determines whether a row was retrieved in block 904. If a row was not retrieved, the begin date of the gap window is set to the effective start date of the parent row before deletion. Control is then passed to condition 909, which is described later. If condition 905 determines that a prior parent row was retrieved in block 904, control is passed to condition 907. Condition 907 then determines whether the effective end date for the parent row being deleted contains a null entry. If it does not, control is passed to block 906, which sets the begin date of the gap window to the effective start date of the row before deletion. Control is then passed to condition 909, which is described below. If condition 907 determines that the effective end date for the parent row being deleted does contain a null entry, control is passed to block 908, which sets the begin date of the gap window to the highest possible date value. Control is then passed to condition 909.

When condition 909 receives control from block 903, block 906, or block 908, it determines whether the parent table being updated or deleted has been defined with an effective end date. If it has, control is passed to condition 910, which determines whether the effective end date of the parent table row contained a null entry before the update or delete. If it did not contain a null entry, control is passed to block 914, which sets the end date of the gap window to the value of the effective end date of the parent table row prior to the update or delete. Control is then passed to block 916, which is discussed below. If condition 910 determines that the effective end date of the parent table row did contain a null entry before the update or delete, control is passed to block 911, which is discussed below. If condition 909 determines that the parent table being updated or deleted has not been defined with an effective end date, control is passed to block 911. Block 911 then retrieves the parent row, which has the same logical primary key as the row being updated or deleted and which follows the row being updated or deleted in chronological order. Control is then passed to condition 912. Condition 912 determines whether the next chronological row was successfully retrieved in block 911. If it was, control is passed to block 913, which sets the end date of the gap window to the value of the effective start date of the next chronological row. Control is then passed to block 916 which is described later. If condition 912 determines that the next chronological row could not be retrieved in block 911, control is passed to block 915. Block 915 then sets the end date of the gap window to the highest possible date value. Control is then passed to block 916.

When block 916 retrieves control from block 913, block 914, or block 915, it executes the second part of the Referential Integrity Dependency Check process shown in FIG. 10B. If errors are encountered during the execution of the second part of the process, dependent rows would be orphaned by the update or deletion of the parent table row. Control is passed to condition 917, which determines whether errors were encountered during the execution of the second part of the process represented by block 916. In errors are detected in condition 917, an error is returned to the Update process or the Delete process depending upon which process invoked the Referential Integrity Dependency Check process. If condition 917 determines that no errors were encountered during the execution of the second part of the process, control is passed to condition 918, which determines whether the table being updated or deleted participates as the parent in any additional referential constraints. If so control is passed back to block 916. Block 916, condition 917, and condition 918 are processed recursively until condition 917 determines that an error has occurred or until condition 918 determines that there are no more referential constraints to process. If condition 918 determines that all of the applicable referential constraints have been processed, there are no dependent rows which would be orphaned by the proposed update or deletion and control is returned to the Update process or the Delete process depending upon which process invoked the Referential Integrity Validation Process.

The second part of the Referential Integrity Dependency Check process shown in FIG. 10B uses the gap window created in the first step of the process to determine whether dependent rows will violate a referential constraint as a result of the update or the deletion of the parent table row. If dependent rows will be orphaned, an error is returned to the first part of the Referential Integrity Dependency Check process. The second part of the process begins with condition 951, which determines whether the begin date of the gap window is less than the end date of the gap window. If it is not, then the gap window does not contain any dates and no dependent rows could be orphaned by the update or delete. In this case, control is passed back to the first part of the Referential Integrity Dependency Check process. If condition 951 determines that the gap window does contain one or more dates, control is passed to condition 952. Condition 952 then determines whether an effective start date has been defined for the foreign key. If it has not, control is passed to block 955, which retrieves the rows from the parent table which have the same logical primary key as the row being updated or deleted. Control is then passed to condition 958, which determines whether any parent rows were retrieved in block 955. If rows were retrieved, dependent rows will not be orphaned by the update or delete and control is returned to the first part of the Referential Integrity Dependency Check process. If condition 958 determines that rows were not retrieved in block 955, control is passed to block 960. Block 960 then retrieves all rows of the dependent table which have foreign key values equal to the logical primary key of the parent row being updated or deleted. Control is then passed to condition 964, which determines whether any dependent rows were retrieved in block 960. If no dependent rows were retrieved, no dependent rows will be orphaned by the update or delete and control is passed back to the first part of the Referential Integrity Dependency Check process. If condition 964 determines that dependent rows were retrieved in block 960, control is passed to condition 963. Condition 963 then determines whether the foreign key has been defined to delete orphaned dependent rows or to nullify the values of the foreign key in the dependent rows. If neither, the rows will violate the referential constraint and an error is returned to the first part of the Referential Integrity Dependency Check process. If condition 963 determines that orphaned dependent rows can be deleted or the values of the foreign key can be nullified, control is passed to block 967. Block 967 then either deletes the orphaned dependent rows or nullifies the values of the foreign key depending on the option defined. Control is then passed back to the first part of the Referential Integrity Dependency Check process.

If condition 952 determines that an effective start date has been defined for the foreign key, control is passed to condition 954. Condition 954 then determines whether an effective end date has been identified for the foreign key. If it has, control is passed to block 957, which retrieves the rows of the dependent table which have foreign key values equal to the logical primary key of the parent table row being updated or deleted and which have effective windows as defined by the foreign key which overlap with the gap window. Control is then passed to condition 956, which is described later. If condition 954 determines that an effective end date has not been identified for the foreign key, control is passed to block 953. Block 953 then retrieves the rows of the dependent table which have foreign key values equal to the logical primary key of the parent table row being updated or deleted and which have effective start dates as defined by the foreign key which are less than the end date of the gap window. Control is then passed to condition 956, When condition 956 receives control from block 953 or block 957, it determines whether any dependent table rows were retrieved. If rows were not retrieved, no dependent table rows would be orphaned by the update or deletion of the parent table row and control is passed back to the first part of the Referential Integrity Dependency Check process. If condition 956 determines that dependent table rows were retrieved in either block 953 or block 957, control is passed to block 959. Block 959 then invokes the Referential Integrity Validation process shown in FIG. 9A for one of the dependent rows that were retrieved. After the Referential Integrity Validation process has been executed, control is passed to condition 961 which determines whether errors were returned by the process. If not, control is passed to condition 965, which is described below. If errors were returned by the Referential Integrity Validation process, control is passed to condition 962. Condition 962 then determines whether the foreign key has been defined to delete orphaned dependent rows or to nullify the values of the foreign key in the dependent rows. If neither, the rows will violate the referential constraint and an error is returned to the first part of the Referential Integrity Dependency Check process. If condition 962 determines that orphaned dependent rows can be deleted or the values of the foreign key can be nullified, control is passed to block 966. Block 966 then either deletes the orphaned dependent row or nullifies the values of the foreign key depending on the option defined. Control is then passed to condition 965. Condition 965 determines whether there are more dependent rows which were retrieved in block 953 or block 957. If there are more dependent rows, control is passed back to block 959. Block 959 through condition 965 will be processed recursively until condition 962 determines that an error has been encountered or until condition 965 determines that all of the dependent rows retrieved have been processed. If condition 965 determines that all of the dependent rows have been processed, no dependent rows will violate the referential constraint as a result of the update or deletion of the parent rows and control is passed back to the first part of the Referential Integrity Dependency Check process.

A psuedocode representation of the Referential Integrity Dependency Check Process flowchart shown in FIG. 10A, and FIG. 10B follows:

---

REFERENTIAL INTEGRITY DEPENDENCY CHECK PROCESS

```
IF DELETE REQUEST IS BEING PROCESSED
  IF EFFECTIVE END DATE IDENTIFIED FOR PARENT TABLE
    PERFORM SELECT-PRIOR-PARENT-ROW
    IF PRIOR ROW IS FOUND
      IF PRIOR ROW EFFECTIVE END DATE IS A NULL ENTRY
        MOVE HIGH DATE VALUE TO GAP BEGIN DATE
      ELSE
        MOVE EFFECTIVE START DATE OF DELETED ROW TO GAP
BEGIN DATE
      END-IF
    ELSE
      MOVE EFFECTIVE START DATE OF DELETED ROW TO GAP
BEGIN DATE
    END-IF
  ELSE
    MOVE HIGH DATE VALUE TO GAP BEGIN DATE
  END-IF
ELSE
  MOVE NEW VALUE OF EFFECTIVE END DATE TO GAP BEGIN DATE
END-IF
IF EFFECTIVE END DATE IDENTIFIED FOR PARENT TABLE
  IF EFFECTIVE END DATE BEFORE CHANGE WAS A NULL ENTRY
    PERFORM SELECT-NEXT-PARENT-ROW
    IF NEXT ROW IS FOUND
      MOVE EFFECTIVE START DATE OF NEXT ROW TO GAP END
DATE
    ELSE
      MOVE HIGH DATE VALUE TO GAP END DATE
    END-IF
  ELSE
    MOVE EFFECTIVE END DATE BEFORE CHANGE TO GAP END DATE
  END-IF
ELSE
  PERFORM SELECT-NEXT-PARENT-ROW
  IF NEXT ROW IS FOUND
    MOVE EFFECTIVE START DATE OF NEXT ROW TO GAP END DATE
  ELSE
    MOVE HIGH DATE VALUE TO GAP END DATE
  END-IF
END-IF.
RETRIEVE FIRST FOREIGN KEY WHERE UPDATED OR DELETED TABLE IS
PARENT
REPEAT UNTIL NO MORE FOREIGN KEYS TO PROCESS
  PERFORM VALI DATE-RI -FOR-DEPENDENT-ROWS
  IF ERRORS ARE RETURNED
    RETURN ERROR (DEPENDENT ROWS WOULD BE ORPHANED BY
CHANGE)
  END-IF
  RETRIEVE NEXT FOREIGN KEY WHERE UPDATED OR DELETED TABLE
IS PARENT
END-REPEAT.
RETURN. (DEPENDENT ROWS WOULD NOT BE ORPHANED BY CHANGE)
SELECT-PRIOR-PARENT-ROW.
SELECT EFFECTIVE END DATE FROM PARENT TABLE
WHERE LOGICAL PRIMARY KEY IS THE SAME AS THE ROW BEING
DELETED
  AND EFFECTIVE START DATE =
    (SELECT MAX(EFFECTIVE START DATE) FROM PARENT TABLE
    WHERE LOGICAL PRIMARY KEY IS THE SAME AS THE ROW
BEING DELETED
    AND EFFECTIVE START DATE < EFFECTIVE START DATE OF
ROW BEING DELETED)
SELECT-NEXT-PARENT-ROW.
```

| REFERENTIAL INTEGRITY DEPENDENCY CHECK PROCESS |
| --- |

```
SELECT EFFECTIVE START DATE FROM PARENT TABLE
WHERE LOGICAL PRIMARY KEY IS THE SAME AS THE ROW BEING
UPDATED OR DELETED
   AND EFFECTIVE START DATE =
      (SELECT MIN(EFFECTIVE START DATE) FROM PARENT TABLE
      WHERE LOGICAL PRIMARY KEY IS THE SAME AS ROW BEING
UPDATED OR DELETED
         AND EFFECTIVE START DATE > START DATE OF ROW BEING
UPDATED OR DELETED)
VALIDATE-RI-POR-DEPENDENT-ROWS.
IF GAP BEGIN DATE < GAP END DATE
   IF AN EFFECTIVE START DATE IS IDENTIFIED FOR THE FOREIGN
KEY
      IF AN EFFECTIVE END DATE IS IDENTIFIED FOR THE FOREIGN
KEY
         PERFORM SELECT-DEPENDENT-ROWS-WHEN-START-AND-END-
DATES-DEFINED
      ELSE
         PERFORM SELECT-DEPENDENT-ROWS-WHEN-START-DATE-
DEFINED
      END-IF
      IF DEPENDENT ROWS WERE FOUND
         RETRIEVE FIRST DEPENDENT ROW OF RESULT SET
         REPEAT UNTIL ALL DEPENDENT ROWS OF THE RESULT SET
ARE PROCESSED
            PERFORM REFERENTIAL INTEGRITY VALIDATION PROCESS
(FIG. 8A)
            IF ERRORS WERE DETECTED
               IF FOREIGN KEY DEFINED TO DELETE ORPHANS
                  DELETE DEPENDENT ROW
               ELSE
                  IF FOREIGN KEY DEFINED TO NULLIFY FOREIGN
KEY
                     UPDATE DEPENDENT ROW WITH NULL ENTRIES
IN FOREIGN KEY
                  ELSE
                     RETURN ERROR (DEPENDENT ROWS WOULD BE
ORPHANED)
                  END-IF
               END-IF
            END-IF
            RETRIEVE NEXT DEPENDENT ROW OF RESULT SET
         END-REPEAT.
      END-IF
   ELSE
      PERFORM SELECT-PARENT-ROWS-WITH-LOGICAL-PRIMARY-KEY
      IF PARENT ROW COUNT = 0
         PERFORM SELECT-DEPENDENT-ROWS-WITH-LOGICAL-PRIMARY-
KEY
         IF DEPENDENT ROWS FOUND
            IF FOREIGN KEY DEFINEDTO DELETE ORPHANS
               DELETE DEPENDENT ROWS
            ELSE
               IF FOREIGN KEY DEFINED TO NULLIFY FOREIGN KEY
                  UPDATE DEPENDENT ROWS WITH NULL ENTRIES IN
FOREIGN KEY
               ELSE
                  RETURN ERROR (DEPENDENT ROWS WOULD BE
ORPHANED)
               END-IF
            END-IF
         END-IF
      END-IF
   END-IF
END-IF.
RETURN. (NO DEPENDENT ROWS WILL BE ORPHANED BY UPDATE OR
DELETE)
SELECT-DEPENDENT-ROWS-WKEN-START-AND-END-DATES-DEFINED
SELECT UNIQUE IDENTIFIER FROM DEPENDENT TABLE
WHERE FOREIGN KEY = LOGICAL PRIMARY KEY OF PARENT ROW BEING
UPDATED OR DELETED
   AND FOREIGN KEY EFFECTIVE START DATE < GAP END DATE
   AND FOREIGN KEY EFFECTIVE END DATE > GAP START DATE
SELECT-DEPENDENT-ROWS-WHEN-START-DATE-DEFINED
SELECT UNIQUE IDENTIFIER FROM DEPENDENT TABLE
WHERE FOREIGN KEY = LOGICAL PRIMARY KEY OF PARENT ROW BEING
UPDATED OR DELETED
   AND FOREIGN KEY EFFECTIVE START DATE < GAP END DATE
```

REFERENTIAL INTEGRITY DEPENDENCY CHECK PROCESS

SELECT-PARENT-ROWS-WITH-LOGICAL-PRIMARY-KEY.
SELECT COUNT(*) FROM PARENT TABLE
WHERE LOGICAL PRIMARY KEY IS THE SAME AS THE ROW BEING UPDATED OR DELETED
SELECT-DEPENDENT-ROWS-WITH-LOGICAL-PRIMARY-KEY.
SELECT UNIQUE IDENTIFIER FROM DEPENDENT TABLE
WHERE FOREIGN KEY = LOGICAL PRIMARY KEY OF PARENT ROW BEING UPDATED OR DELETED

SQL Request Execution Process

Figure 11A:
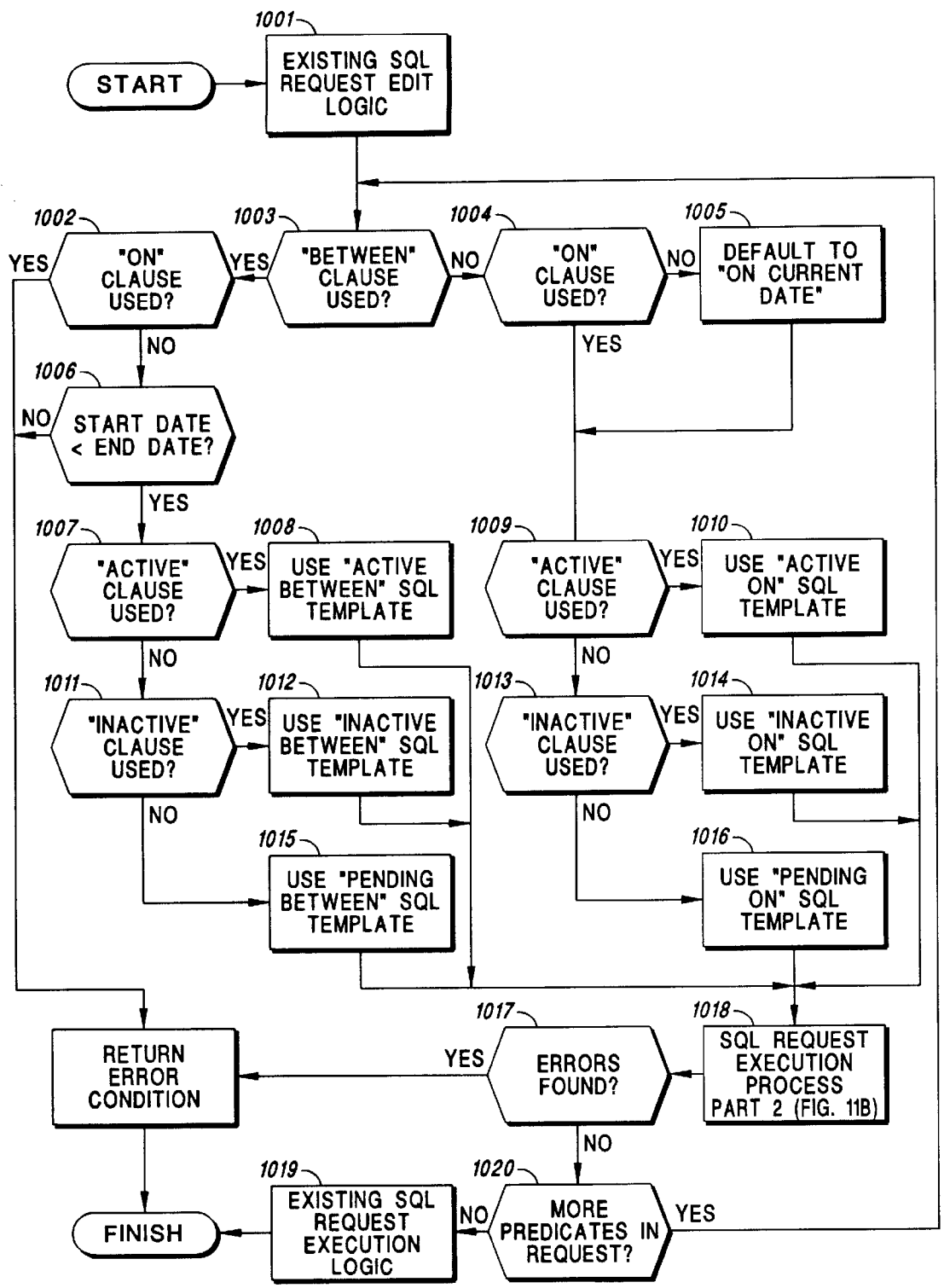
FIGS. 11A and 11B are flowcharts showing the logic added to the SQL request execution process in the preferred embodiment.
Figure 11B:
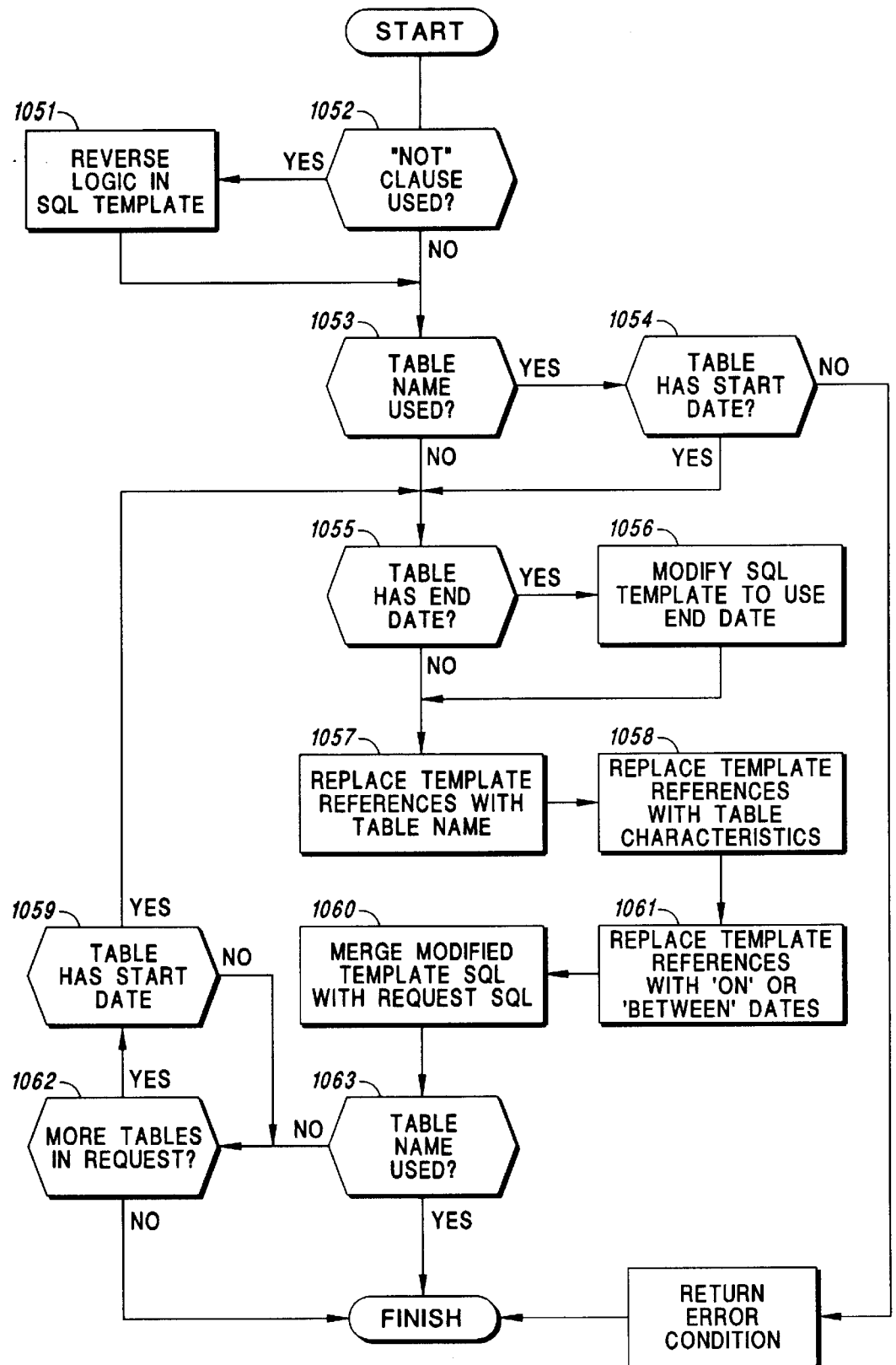

Referring to FIG. 11A, and FIG. 11B, the Structured Query Language (SQL) Request Execution process in the preferred embodiment is shown in flowchart form. SQL is the standard language used for submitting requests to the database management system. In the preferred embodiment, a predicate is added to the WHERE clause of the SQL to facilitate time-dimensional request processing. The format of the time-dimensional predicate is shown in the table below:

WHERE
(table-name)
(IS/WAS/WILL BE) (NOT) ACTIVE/INACTIVE/PENDING
(ON date) (BETWEEN start-date AND end-date)

The "(table-name)" clause is optional and identifies the time-dimensional table for which the predicate applies. If the "(table-name)" is omitted, the predicate will apply for all time dimensional tables referenced in the request. The "(IS/WAS/WILL BE)" clause is optional and is added for clarity only. The DBMS will not use the "(IS/WAS/WILL BE)" clause for time-dimensional processing. The "ACTIVE/INACTIVE/PENDING" clause is required and is used by the DBMS to determine which rows of a time-dimensional table are to be included in the result set based upon their effective status. If "ACTIVE" is specified, all rows which represent current information on the time-dimensional target date will be included. If "INACTIVE" is specified, all rows which represent information that is no longer current on the time-dimensional target date will be included. If "PENDING" is specified, all rows which represent information that is not yet current on the time-dimensional target date will be included. The "(NOT)" clause is optional and indicates that the effective status specified in the "ACTIVE/INACTIVE/PENDING" clause is to be used to exclude rows as opposed to being used to include rows. The "(ON date)" clause is optional and is used to specify a target date for time dimensional processing. The "(BETWEEN start-date AND end-date)" clause is optional and is used to specify a range of target dates for time-dimensional processing. When this clause is included in the predicate, the range of time-dimensional target dates will be defined as all dates from and including the date specified in the "start-date" variable up to, but not including, the date specified in the "end-date" variable. The "(ON date)" clause and the "(BETWEEN start-date AND end-date)" clause may not be used in the same time-dimensional predicate. If neither target date specification clause is included, the current system date will be defaulted as the time-dimensional target date for the predicate.

In the preferred embodiment, the database management system parses the information contained in the time-dimensional predicate. Several expanded time-dimensional predicate templates are pre-defined to the database management system. These templates contain the complex SQL statements required to execute time-dimensional requests without the use of the simplified predicate. The information parsed from the simplified predicate will be used to determine which of the expanded time-dimensional predicate templates will be applied to the request. The appropriate template is modified to include other options specified in the simplified time-dimensional predicate. The template is then modified using specific characteristics of the time-dimensional table which is the target of the predicate to replace generic information contained in the template. The modified template then replaces the simplified template in the original request and the request is executed.

In FIG. 11A, the existing SQL request edit logic is executed in block 1001. Control is then passed to condition 1003 which determines whether the "(BETWEEN start-date AND end-date)" clause was included in the time-dimensional predicate. If so, control is passed to condition 1002 which determines whether the "(ON date)" clause was also included in the predicate. If it was, an error is returned to the requester stating that the "(BETWEEN start-date AND end-date)" and "(ON date)" clauses cannot be included in the same time-dimensional predicate. If condition 1002 determines that the "(ON date)" clause was not included in the time-dimensional predicate, control is passed to condition 1006. Condition 1006 then determines whether the value of the start date specified in the "(BETWEEN start-date AND end-date)" clause is less than the value of the end date. If it is not, an error is returned to the requester stating the that start date of the "(BETWEEN start-date AND end-date)" clause must be less than the value of the end date. If condition 1006 determines that the value of the start date is less than the value of the end date, control is passed to condition 1007. Condition 1007 then determines whether the time-dimensional predicate includes the "ACTIVE" clause. If it does, control is passed to block 1008 which places the "Active Between" template into the expanded time-dimensional predicate buffer. Control is then passed to block 1018, which is described below. If condition 1007 determines that the "ACTIVE" clause was not included in the time-dimensional predicate, control is passed to condition 1011. Condition 1011 then determines whether the time-dimensional predicate contains the "INACTIVE" clause. If it does, control is passed to block 1012, which places the "Inactive Between" template into the expanded time-dimensional predicate buffer. Control is then passed to block 1018 which is described later, If condition 1011 determines that the "INACTIVE" clause is not included in the time-dimensional predicate, control is passed to block 1015 which places the "Pending Between" template into the expanded time-dimensional predicate buffer. Control is then passed to block 1018 which is described later.

If condition 1003 determines that the "(BETWEEN start-date AND end-date)" clause was not included in the time-dimensional predicate, control is passed to condition 1004. Condition 1004 then determines whether the "ON date" clause was included in the time-dimensional predicate. If it was not, control is passed to block 1005, which defaults the target date for time-dimensional processing to the current system date. This is accomplished by assuming the clause "ON CURRENT DATE" for the time-dimensional predicate in block 1005. After this has been completed, control is passed to condition 1009, which is described below. If condition 1004 determines that the "(ON date)" clause has been included in the time-dimensional predicate, control is passed directly to condition 1009. When condition 1009 receives control from condition 1004 or block 1005, it determines whether the time-dimensional predicate includes the "ACTIVE" clause. If it does, control is passed to block 1010, which places the "Active On" template into the expanded time-dimensional predicate buffer. Control is then passed to block 1018, which is described below. If condition 1009 determines that the "ACTIVE" clause was not included in the time-dimensional predicate, control is passed to condition 1013. Condition 1013 then determines whether the time-dimensional predicate contains the "INACTIVE" clause. If it does, control is passed to block 1014, which places the "Inactive On" template into the expanded time-dimensional predicate buffer. Control is then passed to block 1018, which is described below. If condition 1013 determines that the "INACTIVE" clause is not included in the time-dimensional predicate, control is passed to block 1016 which places the "Pending On" template into the expanded time-dimensional predicate buffer. Control is then passed to block 1018.

When block 1018 receives control from block, 1008, block 1010, block 1012, block 1014, block 1015, or block 1016 it invokes the second part of the SQL Request Execution process shown in FIG. 11B. After this has been completed, control is passed to condition 1017, which determines whether errors were returned from the second part of the SQL Request Execution process. If errors were returned, the request is aborted and the errors are returned to the requester. If condition 1017 determines that errors were not returned from the second part of the SQL Request Execution process, control is passed to condition 1020. Condition 1020 then determines whether the request contains any additional time-dimensional predicates which have not been expanded. If so, control is passed back to condition 1003. Condition 1003 through Condition 1020 are processed recursively until an error is encountered in condition 1002, condition 1006, or condition 1017 or until condition 1020 determines that all time-dimensional predicates in the request have been expanded. If condition 1020 determines that there are no additional time-dimensional predicates which need to be expanded, control is passed to block 1019, which performs the existing SQL Request Execution process.

In FIG. 11B, condition 1052 determines whether the "(NOT)" clause is included in the time-dimensional predicate, If it is, control is passed to block 1051, which reverses the logic contained in the expanded time-dimensional predicate buffer to exclude as opposed to including rows of the time-dimensional table. Control is then passed to condition 1053, which is described below. If condition 1052 determines that the "(NOT)" clause is not included in the time-dimensional predicate, control is passed directly to condition 1053. When condition 1053 receives control from block 1051 or condition 1052, it will determine whether the "(table-name)" clause was included in the time-dimensional predicate. If the clause was included, control is passed to condition 1054, which determines whether the named table is time-dimensional. If it is not, an error is returned to the first part of the SQL Request Execution process. If condition 1054 determines that the named table is a time-dimensional table, control is passed to condition 1055, which is described below. If condition 1053 determines that the "(table-name)" clause was not included in the time-dimensional predicate, control is passed directly to condition 1055.

When condition 1055 receives control from condition 1053 or condition 1054, it determines whether an effective end date has been identified for the time-dimensional table which is the target of the time-dimensional predicate. If an effective end date has been identified for the table, control is passed to block 1056, which modifies the statement contained in the expanded time-dimensional predicate buffer to include an effective end date. After this has been accomplished, control is passed to block 1057 which is described later. If condition 1055 determines that the "(table-name)" clause was not included in the time-dimensional predicate, control is passed directly to block 1057. When block 1057 receives control from condition 1055 or block 1056, it modifies the statement in the expanded time-dimensional predicate buffer replacing all references to the generic table name with the name of the time-dimensional table which is the target of the time-dimensional predicate. Control is then passed to block 1058 which modifies the statement contained in the expanded time-dimensional predicate buffer with other characteristics specific to the targeted time-dimensional table. The columns in the logical primary key of the targeted time-dimensional table replace references to the columns of a generic logical primary key. The effective start date column of the targeted time-dimensional table replace references to a generic effective start date column. Any effective end date column identified for the targeted time-dimensional table also replace references to a generic effective end date. After these replacements have been accomplished, control is passed to block 1061, which makes further modifications to the statement contained in the expanded time-dimensional predicate buffer. The dates specified as the date variables in the "(ON date)" and the "(BETWEEN start-date AND end-date)" clauses replace references to generic time-dimensional target dates. After the modifications in block 1061 are made, control is passed to block 1060 which merges the statement contained in the expanded time-dimensional predicate buffer with the original SQL request. This is accomplished by replacing the time-dimensional predicate specified by the user in the original request with the contents of the expanded time-dimensional predicate buffer. Control is then passed to condition 1063.

When condition 1063 receives control, it determines whether the "(table-name)" clause is included in the original time-dimensional predicate. If it is, the expansion of the time-dimensional predicate is complete and control is returned to the first part of the SQL Request Execution process. If condition 1063 determines that the "(table-name)" clause is not included in the original time-dimensional predicate, control is passed to condition 1062. Condition 1062 then determines whether additional tables are referenced in the request which have not been processed for this time-dimensional predicate. If there are additional tables, control is passed to condition 1059, which determines whether the next table referenced in the request is a time-dimensional table. If it is, control is passed back to condition 1055. If condition 1059 determines that the next table referenced in the request is not time-dimensional, control is passed back to condition 1062. Condition 1055 through condition 1063 are processed recursively until condition 1063 determines that the "(table-name)" clause was included in the original time-dimensional predicate or until condition 1062 determines that all tables referenced in the request have been processed. If condition 1062 determines that all tables referenced in the request have been processed, control is passed back to the first part of the SQL Request Execution process.

A psuedocode representation of the SQL Request Execution Process flowchart shown in FIG. 11A, and FIG. 11B follows:

```
SQL REQUEST EXECUTION PROCESS
PERFORM EXISTING SQL REQUEST EDIT LOGIC.
RETRIEVE FIRST TIME-DIMENSIONAL PREDICATE IN REQUEST.
REPEAT UNTIL ALL TIME-DIMENSIONAL PREDICATES HAVE BEEN
PROCESSED
   IF BETWEEN CLAUSE IS INCLUDED IN PREDICATE
     IF ON CLAUSE IS INCLUDED IN PREDICATE
        RETURN ERROR (BETWEEN CLAUSE AND ON CLAUSE CANNOT
BE USED TOGETHER)
        END-IF
     IF BETWEEN START DATE IS NOT LESS THAT BETWEEN END
DATE
        RETURN ERROR (BETWEEN START DATE MUST BE LESS THAN
BETWEEN END DATE)
        END-IF
     IF ACTIVE CLAUSE IS INCLUDED IN PREDICATE
        MOVE ACTIVE-BETWEEN-TEMPLATE TO EXPANDED PREDICATE
BUFFER
        ELSE
          IF INACTIVE CLAUSE IS INCLUDED IN PREDICATE
            MOVE INACTIVE-BETWEEN-TEMPLATE TO EXPANDED
PREDICATE BUFFER
          ELSE
            MOVE PENDING-BETWEEN-TEMPLATE TO EXPANDED
PREDICATE BUFFER
          END-IF
        END-IF
   ELSE
     IF ON CLAUSE IS NOT INCLUDED IN PREDICATE
        ADD 'ON CURRENT DATE' CLAUSE TO PREDICATE
     END-IF
     IF ACTIVE CLAUSE IS INCLUDED IN PREDICATE
        MOVE ACTIVE-ON-TEMPLATE TO EXPANDED PREDICATE
BUFFER
        ELSE
          IF INACTIVE CLAUSE IS INCLUDED IN PREDICATE
            MOVE INACTIVE-ON-TEMPLATE TO EXPANDED PREDICATE
BUFFER
          ELSE
            MOVE PENDING-ON-TEMPLATE TO EXPANDED PREDICATE
BUFFER
          END-IF
        END-IF
   END-IF
   PERFORM MERGE-EXPANDED-PREDICATE-WITH-REQUEST
   IF ERRORS ARE RETURNED
     RETURN ERROR
   END-IF
   RETRIEVE NEXT TIME-DIMENSIONAL PREDICATE IN REQUEST
END-REPEAT.
PERFORM EXISTING SQL REQUEST EXECUTION LOGIC
RETURN. (SQL REQUEST EXECUTED SUCCESSFULLY)
MERGE-EXPANDED-PREDICATE-WITH-REQUEST.
IF 'NOT' CLAUSE IS INCLUDED IN THE PREDICATE
   MODIFY THE EXPANDED PREDICATE BUFFER TO EXCLUDE ROWS
INSTEAD OF INCLUDING
```

SQL REQUEST EXECUTION PROCESS

```
END-IF
IF TABLE NAME IS SPECIFIED IN PREDICATE
    IF TABLE IS NOT TIME-DIMENSIONAL
        RETURN ERROR (TABLE SPECIFIED IS NOT TIME-DIMENSIONAL)
    END-IF
    PERFORM MODIFY-TEMPLATE-FOR-TABLE
ELSE
    RETRIEVE FIRST TABLE REFERENCED IN REQUEST
    REPEAT UNTIL ALL TABLES REFERENCED IN REQUEST HAVE BEEN
PROCESSED
        IF TABLE IS TINE-DIMENSIONAL
            PERFORM MODIFY-TEMPLATE-FOR-TABLE
        END-IF
        RETRIEVE NEXT TABLE REFERENCED IN REQUEST
    END-REPEAT
END-IF.
RETURN.
MODIFY-TEMPLATE-FOR-TABLE.
IF EFFECTIVE END DATE HAS BEEN IDENTIFIED FOR TABLE
    MODIFY EXPANDED PREDICATE BUFFER TO INCLUDE END DATE
LOGIC
END-IF.
REPLACE GENERIC TABLE NAME WITH SPECIFIED TABLE IN EXPANDED
PREDICATE BUFFER.
REPLACE GENERIC LOGICAL PRIMARY KEY WITH LOGICAL PRIMARY KEY
OF TABLE.
REPLACE GENERIC EFFECTIVE START DATE WITH EFFECTIVE START
DATE OF TABLE.
REPLACE GENERIC EFFECTIVE END DATE WITH EFFECTIVE END DATE
OF SPECIFIED TABLE.
REPLACE GENERIC 'ON' DATE WITH 'ON' DATE SPECIFIED IN
REQUEST.
REPLACE GENERIC 'BETWEEN' DATES WITH 'BETWEEN' DATES
SPECIFIED IN REQUEST.
NERGE EXPANDED PREDICATE WITH ORIGINAL REQUEST.
RETURN.
ACTIVE-BETWEEN-TEMPLATE.
WHERE TABLE.START_DATE < BETWEEN.END_DATE
    AND TABLE.START_DATE >=
        (SELECT MAX(SUBQ.START_DATE)
        FROM TABLE SUBQ
        WHERE SUBQ.LOGICAL_PRIMARY = TABLE.LOGICAL_PRIMARY
            AND SUBQ.START_DATE <= BETWEEN.START_DATE)
INACTIVE-BETWEEN-TEMPLATE.
WHERE TABLE.START_DATE <
        (SELECT MAX(SUBQ.START_DATE)
        FROM TABLE SUBQ
        WHERE SUBQ.LOGICAL_PRIMARY = TABLE.LOGICAL_PRIMARY
            AND SUBQ.START_DATE < BETWEEN.END_DATE)
PENDING-BETWEEN-TEMPLATE.
WHERE TABLE.START_DATE > BETWEEN.START_DATE
ACTIVE-ON-TEMPLATE.
WHERE TABLE.START_DATE =
        (SELECT MAX(SUBQ.START_DATE)
        FROM TABLE SUBQ
        WHERE SUBQ.LOGICAL_PRIMARY = TABLE.LOGICAL_PRIMARY
            AND SUBQ.START_DATE <= ON.DATE)
INACTIVE-ON-TEMPLATE.
WHERE TABLE.START_DATE <
        (SELECT MAX(SUBQ.START_DATE)
        FROM TABLE SUBQ
        WHERE SUBQ.LOGICAL_PRIMARY = TABLE.LOGICAL_PRIMARY
            AND SUBQ.START_DATE <= ON.DATE)
PENDING-ON-TEMPLATE.
WHERE TABLE.START_DATE >ON.DATE
```

Conclusion, Ramifications, and Scope

The detailed description has shown how a version differentiation process may be created that requires relatively minor modifications to database management systems, that allows historical, active, and pending versions to be maintained in a single versioned table, that allows versioned tables to be processed by the database management system in a manner that is consistent with the way that non-versioned tables are processed, that allows referential constraints to be enforced on an effective window basis for versioned tables, that automatically prevents overlapping of the effective windows of versioned tables, that does not require that processes be created to maintain denormalized version control columns, that allows requesters to retrieve information from versioned tables in a simple manner, that does not require that views, stored procedures or denormalized columns be created to simplify access by requesters, that allows for the use of the most efficient version differentiation logic possible, that minimizes the possibility of erroneous requests, that minimizes the time required to develop requests which access information from versioned tables, that smoothly integrates versioned tables and version differentiation processing with existing relational database concepts, and that allows versioned tables to be identified to the database management system by database developers in a simple manner similar to that in which non-versioned tables are defined.

While the detailed description contains many specificities, these should not be construed as limitations on the scope of the invention, but rather as an exemplification of one preferred embodiment thereof. It will be appreciated by those of ordinary skill in the art that many variations of the present invention are possible. For example, non-date data types for which a sequence can be automatically determined, such as numbers, times and characters, could be used instead of, or in conjunction with, date data types as the basis for version differentiation processing; multiple table columns as opposed to a single column could be used to differentiate versions in a database table (as would be the case if a date column and a time column were used in combination to differentiate versions); the version differentiation processing logic could be internalized by the database management system without requiring that incoming requests be modified for version differentiation by the database management system prior to execution; database query languages other than the SQL could be modified in the manner described to perform version differentiation; the logic involved in supporting time-dimensional referential constraints is not essential and could be modified to be less restrictive or eliminated altogether; the syntax of the time-dimensional predicate submitted by requesters could be modified for the sake of clarity or ease of use while still performing essentially the same functions; the rules assumed for time-dimensional processing could be altered (as would be the case if effective start values were excluded or effective end values were included in version effective windows).

Thus, the scope of the invention should be determined by the appended claims and their legal equivalents, rather than by the examples given. All changes which come within the meaning and range of equivalency of the claims are intended to be embraced therein.

What is claimed is:

1. A method for row version differentiation in a database management system comprising:
    identifying a versioned table to said database management system;
    creating a physical primary key of the versioned table;
    defining to said database management system at least a first portion of said physical primary key as a logical primary key;
    defining to said database management system at least a second portion of the physical primary key as a version effective reference value;
    deriving version differentiation criteria information from a version differentiation predicate included in a request submitted by a database user, the version differentiation predicate identifying the versioned table and a target effective status; and
    retrieving rows of the versioned table that satisfy the version differentiation criteria as a function of the version differentiation predicate submitted by the database user and the version effective reference value defined to said database management system, including comparing the version effective reference value of the versioned table as defined to the database management system with the version differentiation criteria submitted by the database user.

2. The method for row version differentiation of claim 1 wherein said version effective reference value is a version effective start value, the method for version differentiation further comprising:
    identifying a version effective end value that does not participate in said physical primary key of said versioned table;
    said retrieving of rows from the versioned table including comparing the effective end values of the versioned table with the version differentiation criteria.

3. The method for row version differentiation of claim 2 further comprising:
    defining an effective window for each row of the versioned table as a function of the effective start value and the version effective end value for each row in the versioned table; and
    validating the effective window for one row of the versioned table to ensure that the effective window for the one row of the versioned table does not overlap with effective windows for other rows of the versioned table having logical primary keys matching the logical primary key for the one row of the versioned table.

4. The method for row version differentiation of claim 1 further comprising:
    identifying to said database management system a referential constraint specifying as a parent said versioned table; and
    ensuring that rows exist in the versioned table such that the values of their logical primary keys correspond to the values of the columns of a dependent table identified in the referential constraint for an existing row of the dependent table.

5. The method for row version differentiation of claim 4 wherein said version effective reference value is a version effective start value, the method for version differentiation further including:
    identifying a column of the dependent table during the definition of said referential constraint for use as a referential constraint effective start value; and
    comparing said referential constraint effective start value and said versioned effective start value.

6. The method for row version differentiation of claim 5 further including:
    identifying a column of the dependent table, during the definition of said referential constraint, for use as a referential constraint effective end value; and
    comparing said referential constraint effective start value to said versioned effective start value and said effective end value.

7. The method for row version differentiation of claim 6 further comprising:
    defining a referential constraint effective window for each row of the dependent table as a function of the referential constraint effective start value and the referential constraint effective end value for each row of the dependent table; and
    validating the referential constraint effective window for one row of the dependent table to ensure that the referential constraint effective window for the one row of the dependent table does not overlap with the referential constraint effective windows for other rows of the dependent table having logical primary keys matching the logical primary key for the one row of the dependent table.

8. A method for row version differentiation in a database management system comprising:

identifying a versioned table to said database management system;

creating a physical primary key of the versioned table;

defining to said database management system at least a first portion of said physical primary key as a logical primary key;

defining to said database management system at least a second portion of the physical primary key as a version effective reference value;

deriving version differentiation criteria information from a version differentiation predicate included in a request submitted by a database user, the version differentiation predicate identifying the versioned table and a target effective status, and a target value range as defined by a target start value and a target end value that are included in said version differentiation predicate; and retrieving rows of the versioned table that satisfy the version differentiation criteria as a function of the version differentiation predicate submitted by the user and the version effective reference value defined to said database management system, including comparing the version effective reference value of the versioned table as defined to the database management system with the version differentiation criteria submitted by the database user.

9. The method for row version differentiation of claim 8 further comprising:

validating said target value range for one row of the versioned table to ensure that the target value range for the one row of the versioned table does not overlap with the target value ranges for other rows of the versioned table having logical primary keys matching the logical primary key for the one row of the versioned table.

* * * * *